US005883976A

United States Patent [19]
Ohsawa

[11] Patent Number: 5,883,976
[45] Date of Patent: Mar. 16, 1999

[54] SELECTIVELY UTILIZING MULTIPLE ENCODING METHODS

[75] Inventor: Hidefumi Ohsawa, Kawaguchi, Japan

[73] Assignee: Canon Kabushiki Kaisha, Tokyo, Japan

[21] Appl. No.: 576,910

[22] Filed: Dec. 22, 1995

[30]  Foreign Application Priority Data

Dec. 28, 1994 [JP] Japan .................................. 6-327455
Dec. 28, 1994 [JP] Japan .................................. 6-327497
Dec. 28, 1994 [JP] Japan .................................. 6-327500

[51] Int. Cl.$^6$ ............................. G06K 9/20; G06K 9/36
[52] U.S. Cl. ...................... 382/232; 348/411; 358/261.2
[58] Field of Search ................................. 382/232, 238, 382/245, 246, 247; 348/410, 411, 412; 358/430, 261.2

[56]   References Cited

U.S. PATENT DOCUMENTS

| 4,141,034 | 2/1979 | Netravalli et al. ....................... 348/411 |
| 4,517,596 | 5/1985 | Suzuki .................................... 348/419 |
| 5,008,951 | 4/1991 | Koshi .................................... 382/245 |

(List continued on next page.)

FOREIGN PATENT DOCUMENTS

| 0 238 254 | 9/1987 | European Pat. Off. ........ H04N 1/417 |
| 0 272 505 | 6/1988 | European Pat. Off. . |
| 0 280 574 | 8/1988 | European Pat. Off. ........ H04N 7/137 |
| 0 446 018 | 9/1991 | European Pat. Off. ......... H04N 1/46 |
| 0444918 | 9/1991 | European Pat. Off. . |
| 0 491 556 | 6/1992 | European Pat. Off. ......... H04N 1/41 |
| 0 513 520 | 11/1992 | European Pat. Off. . |
| 0 534 282 | 3/1993 | European Pat. Off. ........ H04N 7/137 |
| 0615384 | 9/1994 | European Pat. Off. . |
| 2 688 369 | 9/1993 | France . |
| 2 309 444 | 8/1974 | Germany . |
| 42 39 | 9/1993 | Germany ........................ H03M 7/30 |
| 03062737 | 3/1991 | Japan . |
| 05252535 | 9/1993 | Japan . |

OTHER PUBLICATIONS

A. K. Jain, "Image Data Compression: A Review", Proceedings of the IEEE, vol. 69, No. 3, Mar. 1981, pp. 349–389.

R. J. Stewart, et al., "An Adaptive Technique to Maximize Lossless Image Data Compression of Satellite Images", Robotics & Computer–Integrated Manufacturing, vol. 11, No. 2, 1994, pp. 111–115.

Kuduvalli, G.R. et al. "Performance Analysis of Reversible Image Compression Techniques for High–Resolution Digital Teleradiology" IEEE Transactions on Medical Imaging, 1 Sep. 1992 vol. 11, NO. 3, pp. 430–445.

Saito, T. "Delayed–Decision Pattern–Matching Lossy Image Coding Via Copying" Signal Processing Theories and Applications, Brussels, Aug. 24–27, 1992 vol. 3, pp. 1505–1508.

(List continued on next page.)

*Primary Examiner*—Yon J. Couso
*Assistant Examiner*—Jayanti K. Patel
*Attorney, Agent, or Firm*—Fitzpatrick, Cella, Harper & Scinto

[57]   ABSTRACT

The invention is to exactly select an enconding method with satisfactory encoding efficiency, by comparing the final predicted code lengths for plural encoding methods, prior to the actual encoding operation. This object can be attained by an encoding device comprising generation means for generating difference data between an encoding target pixel and another pixel in each of the predetermined plural difference encoding methods, first prediction means for predicting the code length in case the difference data generated by the generation means are encoded, second prediction means for predicting the data length of additional data, other than the difference data generated by the generation means, selection means for selecting one of the difference encoding methods based on the code length predicted by the first prediction means and the data length predicted by the second prediction means, and difference encoding means for effecting difference encoding according to the result of selection by the selection means.

13 Claims, 24 Drawing Sheets

U.S. PATENT DOCUMENTS

| | | | |
|---|---|---|---|
| 5,086,487 | 2/1992 | Katayama et al. | 382/238 |
| 5,138,673 | 8/1992 | Yoshida et al. | 382/238 |
| 5,157,488 | 10/1992 | Pennebaker | 358/133 |
| 5,287,193 | 2/1994 | Lin | 358/261.1 |
| 5,297,220 | 3/1994 | Nomizu | 382/247 |
| 5,339,164 | 8/1994 | Lim | 358/261.1 |
| 5,341,442 | 8/1994 | Barrett | 382/166 |
| 5,374,916 | 12/1994 | Chu | 340/146.2 |
| 5,381,145 | 1/1995 | Allen et al. | 341/107 |
| 5,475,501 | 12/1995 | Yagasaki | 358/426 |

OTHER PUBLICATIONS

Nobutaka, Kuroki et al. "Lossless Image Compression by Two–Dimensional Linear Prediction with Variable Coefficients" IEICE Transactions on Fundamentals of Electronics, Communications and Computer Sciences, 1 Jul. 1992, vol. E75 A, No. 7, pp. 882–889.

Gharavi, H. "Low Bit–Rate Video Transmission for ISDN Application" IEEE Transactions on Circuits and Systems Feb. 1988, vol. 35, No. 2, pp. 258–261.

Lo, K–T, "Predictive Mean Search Algorithm for Vector Quantization of Images" Proceedings of the International Conference on Acoustics, Speech and Signal Processing, (ICASSP), I. Image and Multidimensional Signal Processing Adelaide, Apr. 19–22 1994, vol. pp. V–609–V–612.

Todd, S. "Parameter Reduction and Context Selction for Compression of Gray–Scale Images" British Journal of Photography, 1 Mar. 1985, vol. 29, No. 2, pp. 188–193.

X : TARGET PIXEL

| ENCODE MODE NO. | DIFFERENCE GENERATION EQUATION |
|---|---|
| 1. | $X - A$ |
| 2. | $X - B$ |
| 3. | $X - C$ |
| 4. | $X - (A + B - C)$ |
| 5. | $X - (A + \frac{B-C}{2})$ |
| 6. | $X - (B + \frac{A-C}{2})$ |
| 7. | $X - \frac{A+B}{2}$ |

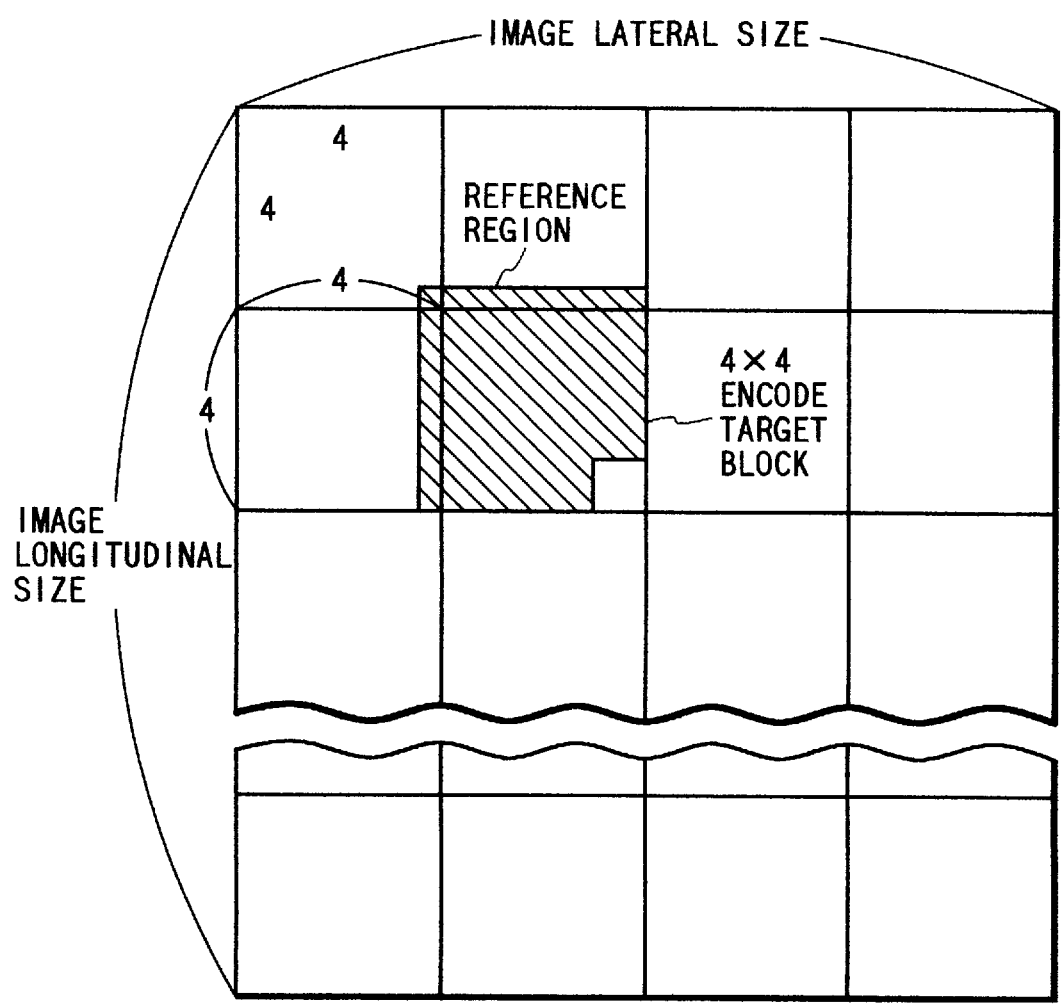

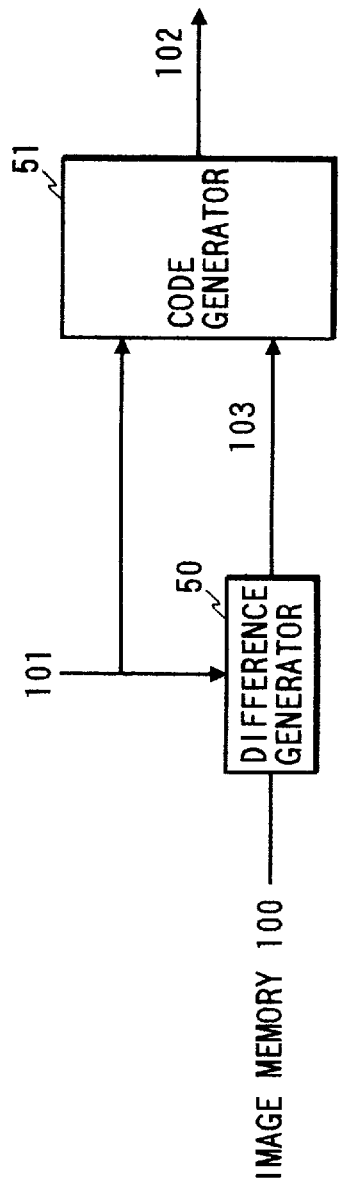

FIG. 7

| DIFFERENCE VALUE | GROUP | HUFFMAN CODE | ADDITIONAL BIT LENGTH |
|---|---|---|---|
| 0 | 0 | 00 | 0 |
| -1, 1 | 1 | 010 | 1 |
| -3, -2, 2, 3 | 2 | 011 | 2 |
| -7, ---- -4, 4, ---- 7 | 3 | 100 | 3 |
| ⋮ | ⋮ | ⋮ | ⋮ |
| -32767, -16384 | 15 | | 15 |
| 16384, ---- 32767 | | 1 1111 1111 1110 | |

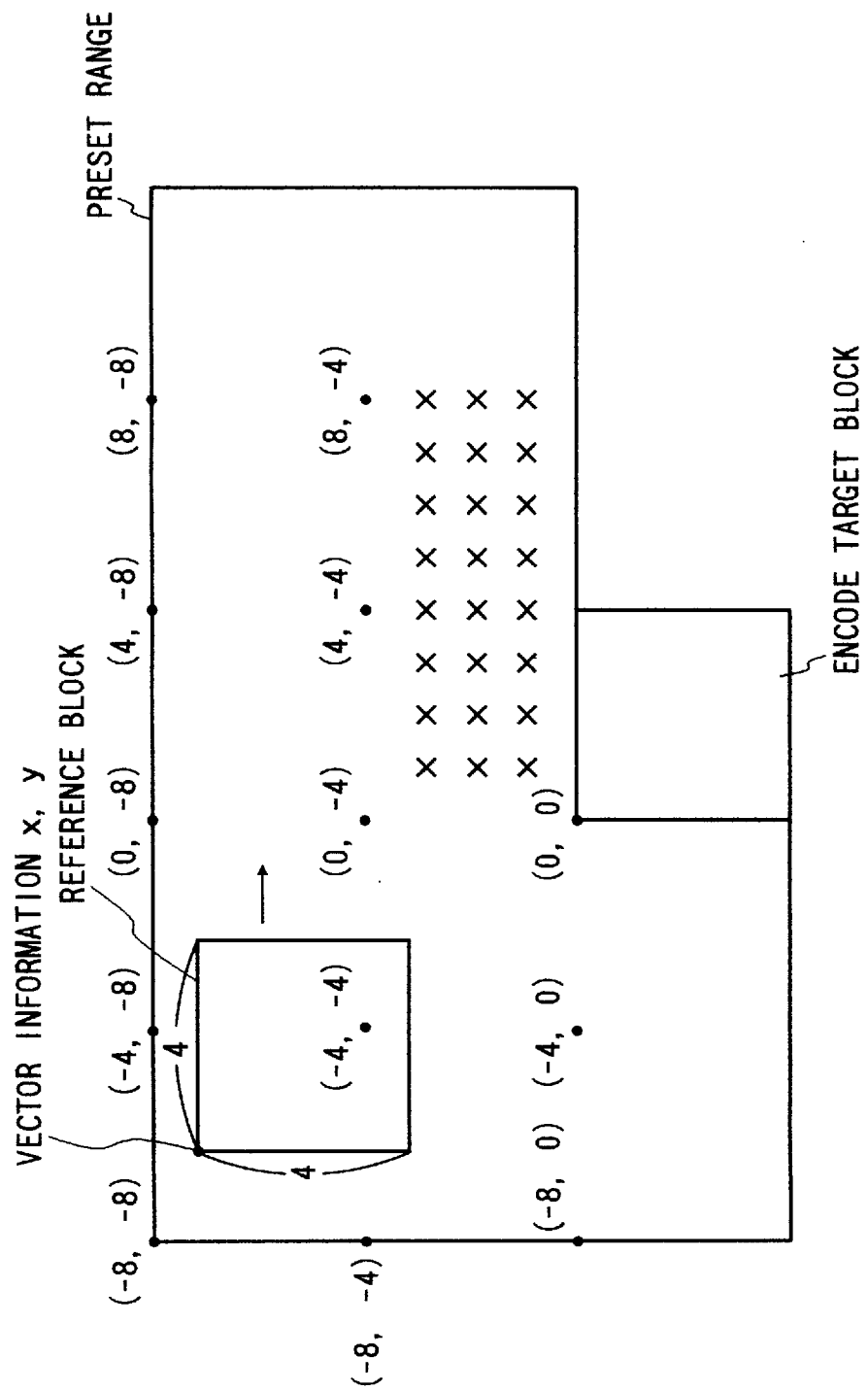

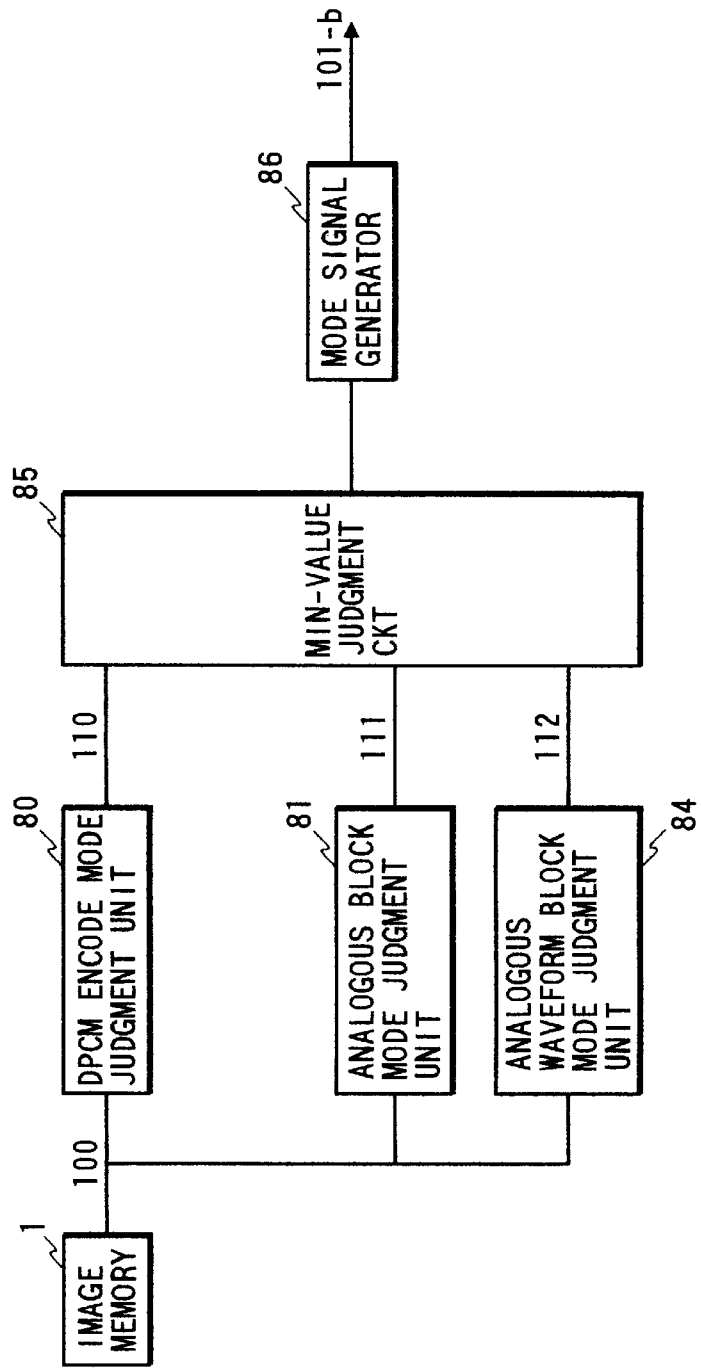

EX) WHEN ENCODE TARGET BLOCK = 4 × 4 PIXELS

REFERENCE REGION

ENCODE TARGET BLOCK M(i, j)

(IN CASE OF ENCODE MODE 2)
X−A

| 0 | 1 | 1 | 1 |
|---|---|---|---|
| 1 | 0 | 3 | 1 |
| 0 | 2 | 1 | 5 |
| 1 | 1 | 5 | 12 |

DIFFERENCE VALUE DATA N(i, j)

→ BLOCK ABSOLUTE DIFFERENCE VALUE SUM 44 $= \sum_i \sum_j |N(i, j)| = 35$ (IN CASE OF ENCODE MODE 4)
X−(A+B−C)

| -1 | 1 | 0 | 0 |
|---|---|---|---|
| -1 | -1 | 3 | -2 |
| 0 | 2 | -1 | 4 |
| 1 | 0 | 4 | 7 |

DIFFERENCE VALUE DATA N(i, j)

→ BLOCK ABSOLUTE DIFFERENCE VALUE SUM 44 $= \sum_i \sum_j |N(i, j)| = 28$

EX) WHEN ENCODE TARGET BLOCK = 4×4 PIXELS

BLOCK ABSOLUTE
DIFFERENCE = ΣΣ|N(i, j)| = 16
VALUE SUM  i j

| #1 | #2 | #3 | #4 |
|----|----|----|----|
| #5 | #6 | #7 | #8 |
| #9 | #10 | #11 | #12 |
| #13 | #14 | #15 | #16 |

EXAMPLE OF ALLOCATION OF DIFFERENCE
VALUE DATA N(i, j)

EXAMPLE OF USE OF REFERENCE BLOCK WITH ROTATING IT (PATTERN A) 0°  (PATTERN B) 90°
(PATTERN C) 180°  (PATTERN D) 270°

REFERENCE BLOCK → READ → NEW REFERENCE BLOCK AFTER READ

READ ORDER OF ABOVE REFERENCE BLOCK → PIXEL POSITION AFTER READ

DIFFERENCE BETWEEN BLOCKS

ENCODE TARGET BLOCK

| STATE | DISCRIMINANT | OUTPUT SIGNAL (LAYOUT INFORMATION) |
|---|---|---|
| A. | $x \geq 4$ OR $x \leq -4$ | 1 |
| B. | $x = 3$ | 01 |
| C. | $x = -3$ | 001 |
| D. | $x = 2$ | 0001 |
| E. | $x = -2$ | 00001 |
| F. | $x = 1$ | 000001 |
| G. | $x = -1$ | 0000001 |
|   | $x = 0$ | 0000000 | x : DIFFERENCE VALUE DATA

CORRESPONDENCE BETWEEN ENCODE PIXEL x
AND ALREADY-ENCODED PERIPHERAL PIXEL

FIG. 27

| BLOCK INFORMATION | ARITHMETIC-ENCODED LAYOUT INFORMATION | HUFFMAN-ENCODED LARGE DIFFERENCE VALUE DATA |
|---|---|---|

FIG. 28

| DIFFERENCE VALUE DATA | HUFFMAN CODE |
|---|---|
| -3~3 | NO CORRESPONDING CODE |
| 4 | |
| -4 | |
| 5 | |
| -5 | |
| ... | OPTIMAL HUFFMAN |
| 127 | |
| -127 | |
| ESC (-128) | |
| 128≦ | ESC+HUFF (X−124) |
| -128≧ | ESC+HUFF (X+124) |

SELECTIVELY UTILIZING MULTIPLE ENCODING METHODS

BACKGROUND OF THE INVENTION

1. Field of the Invention

The present invention relates to an encoding device for encoding data, and a method therefor.

2. Related Background Art

As a reversible encoding method, there is conventionally known DPCM+entropy encoding which is the internationally standardized JPEG method.

This method consists of calculating a predicted value for an encoding target pixel, utilizing pixels therearound, then generating difference data between the predicted value and the actual pixel value of the encoding target pixel, and effecting variable-length encoding such as Huffman encoding on the difference data.

FIG. 3A shows an example of the predicting method for generating the above-mentioned predicted value.

There are illustrated a target pixel X, and surrounding pixels a, b, c used for prediction. There are provided 7 equations for generating the difference between the predicted value and the target pixel X, and one of the equations is suitably selected.

Also among the blockwise difference encoding methods, there is known a method for encoding the difference data between an encoding target block and a reference block obtained from the already encoded area.

In case of selecting an efficient encoding method from plural difference encoding methods by predicting the encoding efficiency, the efficiency has conventionally been compared by the code length of the difference data, but, in the blockwise difference encoding methods, the code length may eventually become longer since other data (such as vector information in the embodiments of the present invention) have to be added in a larger amount, in comparison with the encoding methods utilizing the correlation of nearby pixels.

Also in case of selecting an efficient encoding method from plural difference encoding methods by predicting the encoding efficiency in succession, there is required a long time for such prediction because other encoding methods have to still be evaluated even if an encoding method satisfying the required encoding efficiency is identified in the course of such prediction.

Also in the conventional DPCM encoding mentioned above, since only one prediction mode (method of difference generation utilizing the target pixel X and the nearby pixels a, b, c) can be selected for each image, the encoding efficiency cannot be improved if the character of the image varies locally within the image.

Also there is only utilized the correlation between the encoding target pixel and the nearby pixels, the correlation with other pixels cannot be utilized.

Also in the blockwise difference encoding methods, the reference block can only be selected from the already encoded area, and there cannot be utilized even the correlation with the nearby pixels.

Furthermore, in the blockwise difference encoding methods mentioned above, even if the reference block and the encoding target block are similar in the frequency characteristics, the encoding efficiency cannot be improved if these blocks are generally different in luminosity or in density.

Furthermore, the adaptive Huffman encoding or the dynamic arithmetic encoding is utilized for the conventional variable-length encoding mentioned above, but these encoding methods have been associated with the following drawbacks: (i) In Huffman encoding, in which a code is assigned to a difference data, the shortest code for a pixel cannot be less than 1 bit; (ii) Also in case the difference between the most frequently appearing difference data and the next most frequently appearing difference data is small, the code for a pixel becomes two bits or longer; (iii) On the other hand, the arithmetic encoding, being capable of encoding without partition in the difference data, can dispense with the above-mentioned fixed bit length for each difference data; (iv) However, in case of applying the arithmetic encoding to the encoding of multi-value data, the difference data are encoded bit by bit, and the statistical model of conditions for such bit encoding is difficult to prepare; and (v) Also the number of levels of such multi-value data is large, the encoding efficiency cannot be better in comparison with that of the Huffman encoding.

Also in case plural encoding methods are simultaneously employed within an image, there is required positional information indicating the image area in which each encoding method is used, but such information has to be prepared separately from the difference data encoded by such plural encoding methods, so that the entire data amount after encoding becomes inevitably large.

SUMMARY OF THE INVENTION

An object of the present invention is to resolve at least one of the above-mentioned drawbacks of the prior art.

Another object of the present invention is to enable, prior to the encoding, selection of an encoding method with satisfactory encoding efficiency in precise manner from plural encoding methods, by making comparison with the predicted final code length for each of the plural encoding methods.

The above-mentioned objects can be attained, according to a preferred embodiment of the present invention, by an encoding device for encoding image information, comprising:

generation means for generating difference data between an encoding target pixel and a pixel other than said encoding target pixel, for each of predetermined plural difference encoding methods;

first prediction means for predicting the code length in case of encoding the difference data generated by said generation means;

second prediction means for predicting the data length of additional data other than the difference data generated by said generation means;

selection means for selecting one of said difference encoding methods, based on the code length predicted by said first prediction means and the data length predicted by said second prediction means; and difference encoding means for effecting difference encoding according to the result selected by said selection means.

Still another object of the present invention is, in the course of predicting the encoding efficiency in succession for selecting an encoding method of satisfactory encoding efficiency from plural encoding methods, to reduce the entire process time for the prediction of the encoding efficiency, by not effecting the prediction of the encoding efficiency for other encoding methods in case an encoding method satisfying the required encoding efficiency is identified in the above-mentioned plural encoding methods.

The above-mentioned object can be attained, according to a preferred embodiment of the present invention, by an encoding method for encoding image information, comprising steps of:

generating difference data between an encoding target pixel and a pixel other than said encoding target pixel, for each of predetermined plural difference encoding methods;

predicting the code length in case of encoding the difference data generated by said generation step;

predicting the data length of additional data other than the difference data generated by said generation step;

selecting one of said difference encoding methods, based on the code length predicted in said first prediction step and the data length predicted in said second prediction step; and effecting difference encoding according to the result of selection in said selection step.

Still another object of the present invention is to enable encoding adaptive to the local property of the image.

Still another object of the present invention is to enable selection from a larger number of reference blocks, by using not only those within the already encoded pixels but also those including the unencoded pixels, thereby improving the encoding efficiency.

Still another object of the present invention is to improve the encoding efficiency by considering the frequency characteristics of each block.

Still another object of the present invention is to provide a difference generating method capable of improving the encoding efficiency, even in case the difference between the above-mentioned reference block and the encoding target block does not become small.

Still another object of the present invention is to enable, among said plural encoding methods, selection of an encoding method with satisfactory encoding efficiency according to the magnitude of the data to be encoded.

Still another object of the present invention is to selectively prepare positional information and encoded data from the data to be encoded, thereby reducing the entire data amount after the encoding and improving the encoding efficiency.

Still another object of the present invention is to enable selection, from plural statistical probability tables employed in the arithmetic encoding, of a suitable table according to the situation of the pixels around the encoding target pixel.

Still other objects of the present invention, and the features thereof, will become fully apparent from the following description of the embodiments, which is to be taken in conjunction with the attached drawings.

BRIEF DESCRIPTION OF THE DRAWINGS

FIG. 4 is a view showing the manner of encoding by the DPCM encoding mode;

FIG. 5 is a block diagram of an encoding unit 3;

FIG. 6 is a view showing an example of encoded data format in an embodiment 1;

FIG. 7 is a view showing an example of Huffman code employed in the embodiment 1;

FIG. 10 is a view showing the manner of search for an analogous block or an analogous wave form block;

FIG. 11 is a view showing an example of encoded data format in an embodiment 2;

FIG. 12 is a view showing an example of the encoding mode judgment unit 2 in an embodiment 3;

FIG. 27 is a view showing encoded data format in an embodiment 4;

FIG. 28 is a correspondence table of Huffman codes employed in the embodiment 4;

DETAILED DESCRIPTION OF THE PREFERRED EMBODIMENTS

[Embodiment 1]

Figure 2:
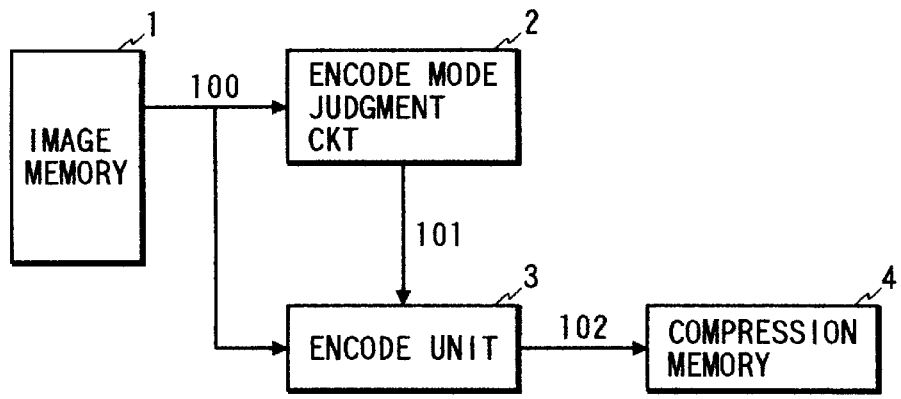
FIG. 2 is a block diagram of an encoding control device.

FIG. 2 is a block diagram of an encoding control device constituting an embodiment 1 of the present invention.

In FIG. 2, there are provided an image memory 1; an encoding mode judgment circuit 2; an encoding unit 3 capable of switching the encoding method according to an encoding mode signal 101; and a compression memory 4 for storing encoded data 102.

Image data 100, entered from the image memory 1, are supplied to the encoding mode judgment unit 2 and the encoding unit 3.

The encoding mode judgment unit 2 selects an encoding mode which is anticipated to provide a short code length in the DPCM encoding of the image data 100, and generates a corresponding encoding mode signal 101.

Now the encoding mode judgment circuit 2 will be explained with reference to FIG. 1.

Figure 3A:
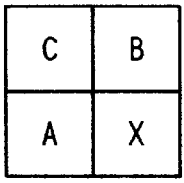
FIG. 3A is a view showing an example of the difference generating method corresponding to an encoding mode.
Figure 3B:
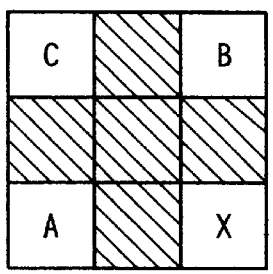
FIG. 3B is a view showing a variation of the difference generating method shown in FIG. 3A.

Encoding mode arithmetic units 10a–10g, in response to the image data 100, generate difference data 200a–200g with respect to a pixel X in an encoding target block shown in FIG. 4, respectively utilizing predetermined difference generation formulas corresponding to seven encoding modes (hereinafter called DPCM encoding modes) as shown in FIGS. 3A and 3B.

FIG. 4 shows the manner of encoding of an image.

In FIG. 4, a block of 4×4 pixels is extracted from the image, and the encoding mode is switched for each encoding target block.

In the first embodiment, among the pixels adjacent to the encoding target block of 4×4 pixels and the nearby pixels within the block, reference is made to a hatched area.

In-block calculation units 11a–11g respectively calculate the difference data 200a–200g of each encoding target block as the total sum of absolute values of each block (hereinafter called block absolute difference sum, to be explained in relation to FIG. 17), and release block absolute difference sum data 201a–201g.

A minimum value judgment circuit 12 identifies the minimum of the block absolute difference sum data 201a–201g and selects the encoding method showing the minimum. A mode signal generation unit 13 releases an encoding mode signal 101 corresponding to the mode selected by the minimum value judgment circuit 12.

Figure 1:
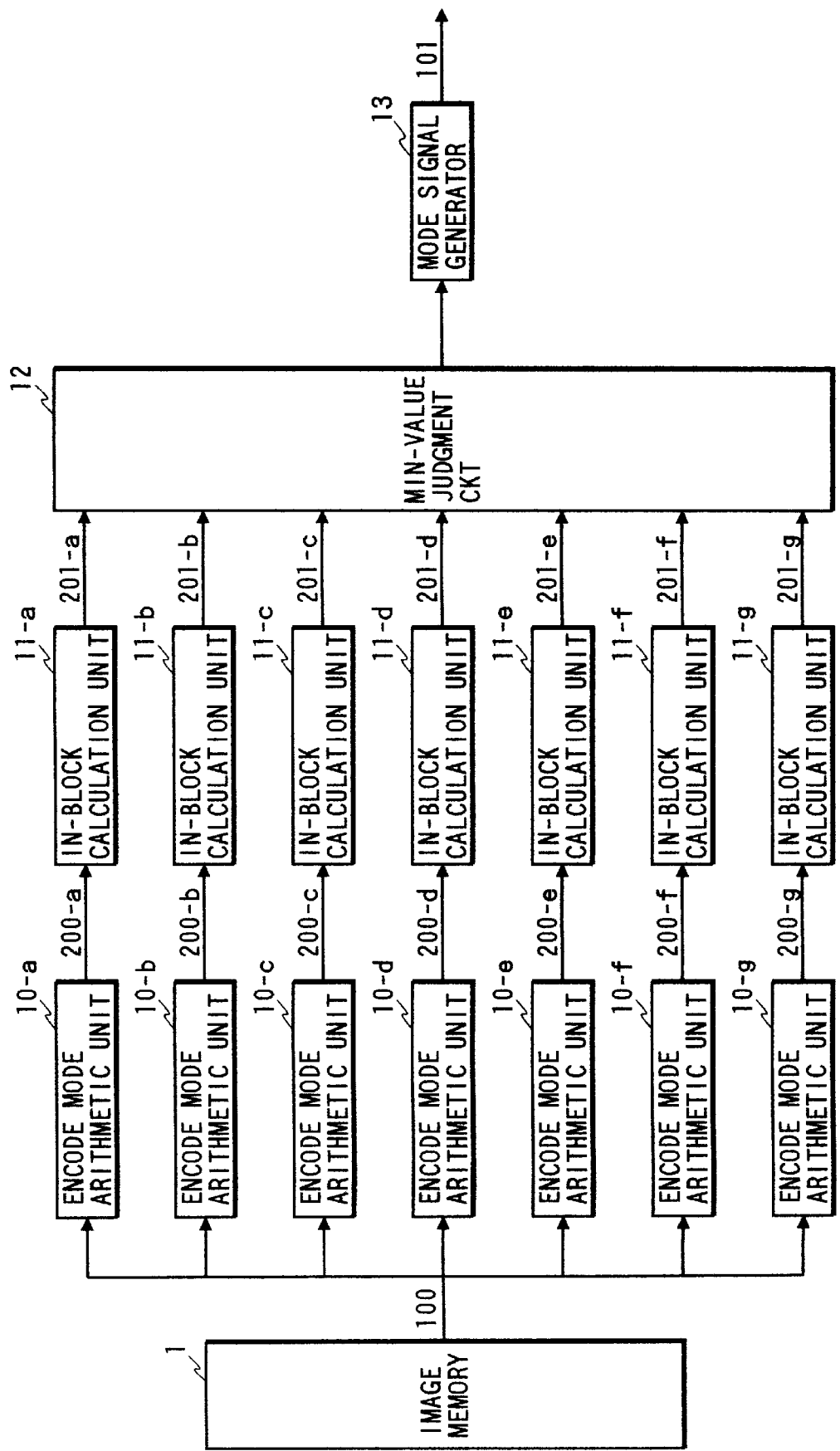
FIG. 1 is a block diagram of a DPCM encoding mode judgment unit.

In FIG. 1, the seven formulas shown in FIGS. 3A and 3B are assigned as the seven encoding modes, but there may also be employed other suitable formulas for generating the difference, and the number of encoding modes is not limited to seven.

In the present embodiment, the encoding mode arithmetic unit 10a calculates the difference between each target pixel X within the encoding target block and a pixel A adjacent to the left.

The encoding mode arithmetic unit 10b calculates the difference between the target pixel X and a pixel B adjacent immediately above.

The encoding unit 3 switches the DPCM encoding method according to the encoding mode signal 101.

Figure 17:
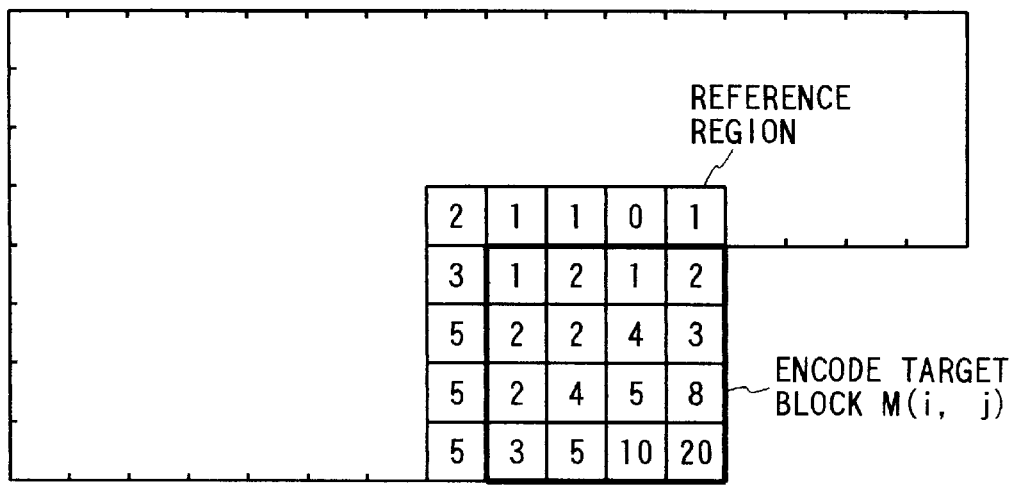
FIG. 17 is a view showing the manner of determining an absolute difference sum in the DPCM encoding mode.

FIG. 17 shows the manner of calculation of the block absolute difference sum for an encoding mode number 2 and an encoding mode number 4.

In case of the encoding mode number 2, for all the pixels M(1, 1) to M(4, 4) within the encoding target block M(i, j), the difference from a pixel adjacent immediately above is calculated, and the differences for all the pixels mentioned above are set as N(1, 1) to N(4, 4).

The block absolute difference sum is the sum of the absolute values of N(1, 1) to N(4, 4). Similar operations are conducted also for the encoding mode number 4.

FIG. 5 is a block diagram of the encoding unit 3.

A difference generator 50 switches the difference generating formula according to the encoding mode signal 101, and generates, in succession, the difference data 103 of the encoding target blocks shown in FIG. 4, utilizing the image data 100.

A code generator 51 generates encoded data 102 by adding the encoding mode signal 101 to the difference data 103.

Figures 19, 20:
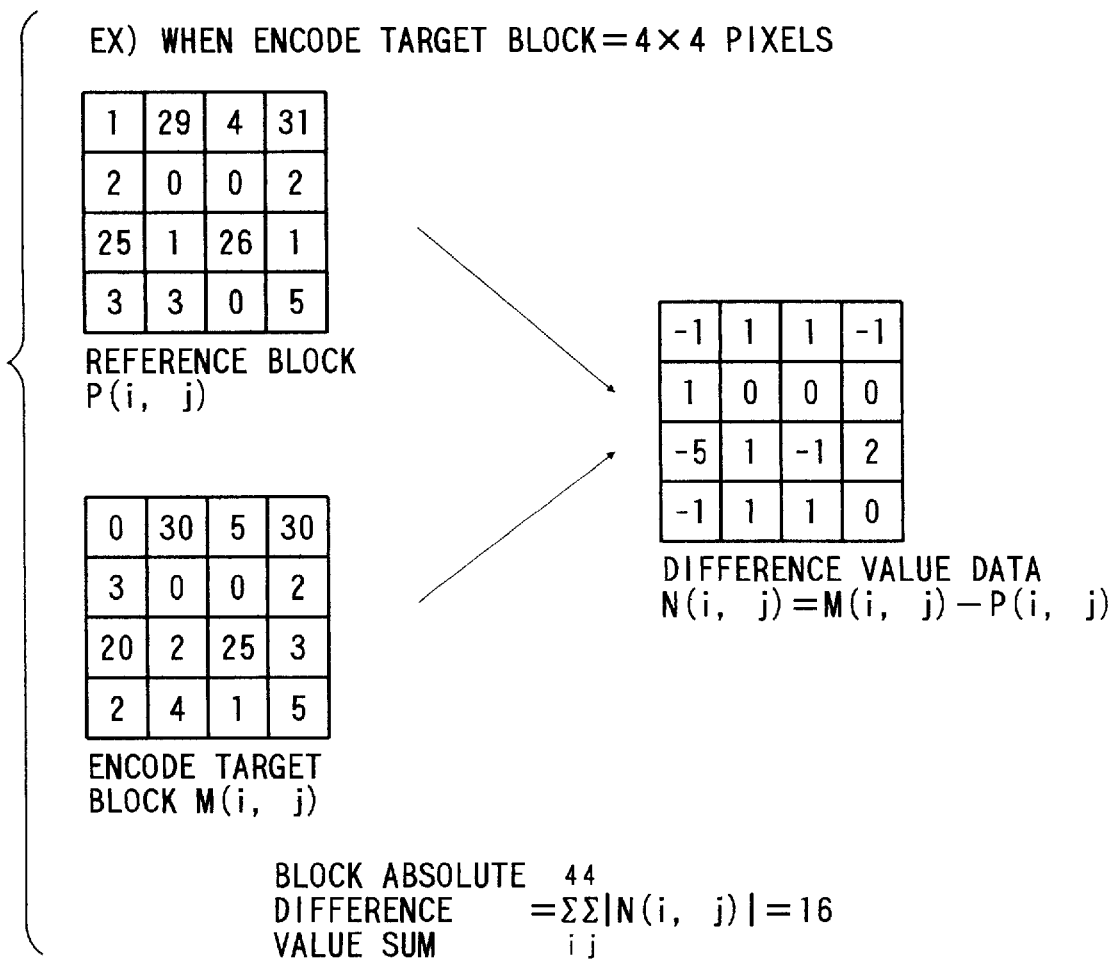
FIG. 19 is a view showing the manner of determining an absolute difference sum in the analogous block mode and in the analogous wave form block mode.
FIG. 20 is a view showing the assignment of encoding order in 4×4 block data.

FIG. 6 shows an example of the data format employed in the encoded data 102 generated in the code generator 51. At the top of the encoded data 102 of each encoding target block, there are provided block encoding mode number data, indicating the encoding mode employed for each encoding target block. Thereafter provided are Huffman codes and additional bits, assigned as shown in FIG. 7 to the 16 difference data within the 4×4 pixel block as shown in FIG. 20.

FIG. 7 shows an example of Huffman encoding employed in the present embodiment. The difference data are divided into plural groups, in the decreasing order of magnitude of the difference data, and a Huffman code is assigned to each group, and additional bits are added for identifying the difference values within the group. For example, for a group 2, additional bits '00', '01', '10' and '11' are employed for identifying four differences −3, −2, 2 and 3.

The first embodiment, being capable of switching the encoding mode for each block, can achieve adaptive encoding according to the local image quality, for example an image area showing strong horizontal correlation or an image area showing strong vertical correlation, within an image.

[Embodiment 2]

In case the encoding target block contains an image with a screen dot pattern, the mere calculation of the difference between the longitudinally or laterally positioned nearby pixels as in the first embodiment, where the highest uniform correlation is anticipated to exist, may not be able to sufficiently reduce the difference between the blocks, and may not achieve sufficiently high compression. An example of such image pattern is shown in FIG. 18.

Figure 18:
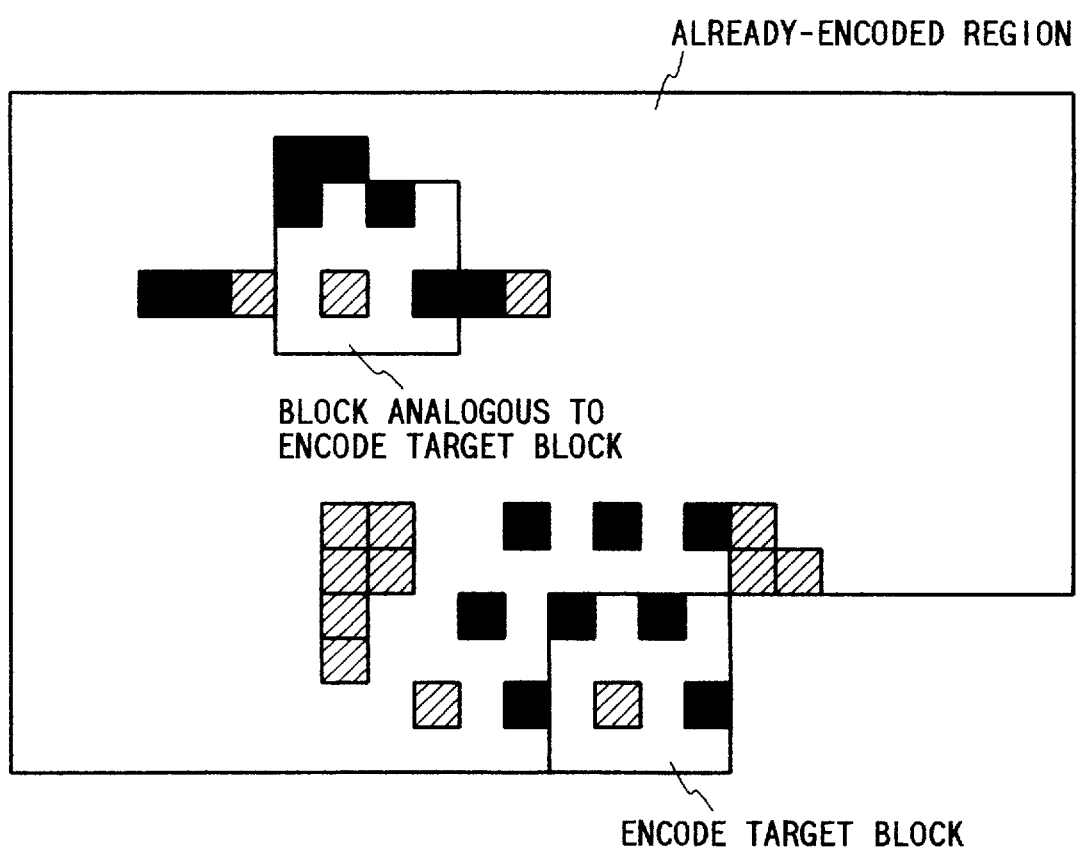
FIG. 18 is a view showing an encoding target block suitable for analogous block mode.

Although the present invention contemplates a multivalue image, three density levels are illustrated in FIG. 18 for the ease of explanation.

In case the encoding target block has a pattern as shown in FIG. 18, the difference data obtained from every pixel by the DPCM encoding mode in the first embodiment do not become very small as the data are obtained by calculating the differences with the adjacent pixels.

However, the encoded data can be shortened by determining the difference between the blocks by employing a block present in the already encoded area and analogous to the encoding target block and encoding such difference data.

Thus, in such case, there is adopted a method of searching an analogous block area within the already encoded area and encoding the difference between such analogous block and the encoding target block.

Figure 8:
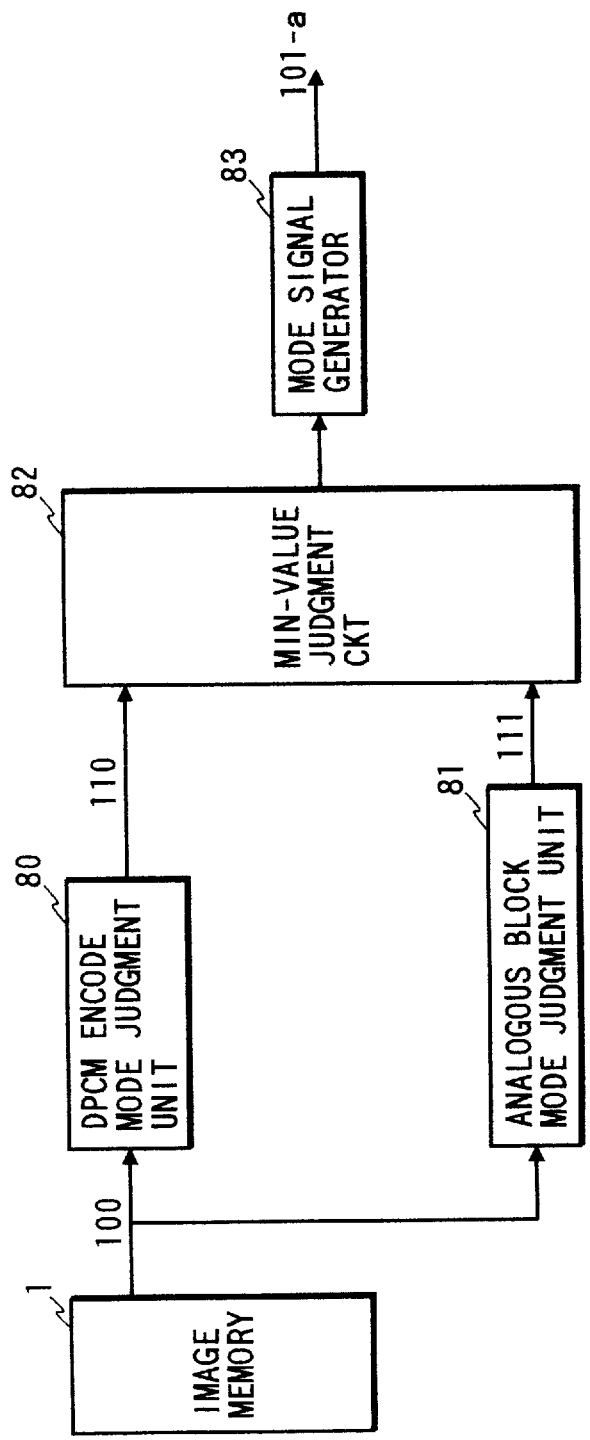
FIG. 8 is a block diagram showing an example of an encoding mode judgment unit 2 in an embodiment 2.

FIG. 8 is a block diagram showing an example of the encoding mode judgment unit 2 for realizing such encoding mode (hereinafter called analogous block mode).

A DPCM encoding mode judgment unit 80 is a block of the encoding mode judgment circuit 2 shown in FIG. 1, composed of the encoding mode arithmetic units 10, the in-block calculation unit 11 and the minimum value judgment circuit 12, and releases data 110 including an encoding mode signal 110a and difference data 110b providing the minimum value from the minimum value judgment circuit 12.

An analogous block mode judgment unit 81 releases data 111 including vector information 111a indicating the position of the analogous block and difference data 111b between the analogous block and the encoding target block.

A minimum value judgment circuit 82 compares the difference data 110b and 111b contained in the data 110 and 111, and selects the smaller one. According to the result of this selection, there is judged whether the encoding in a mode signal generator 83 is to be conducted by the DPCM encoding mode in the embodiment 1 or by the analogous block mode, and an encoding mode signal 101a is released instead of the encoding mode 101 in the embodiment 1.

Figure 9:
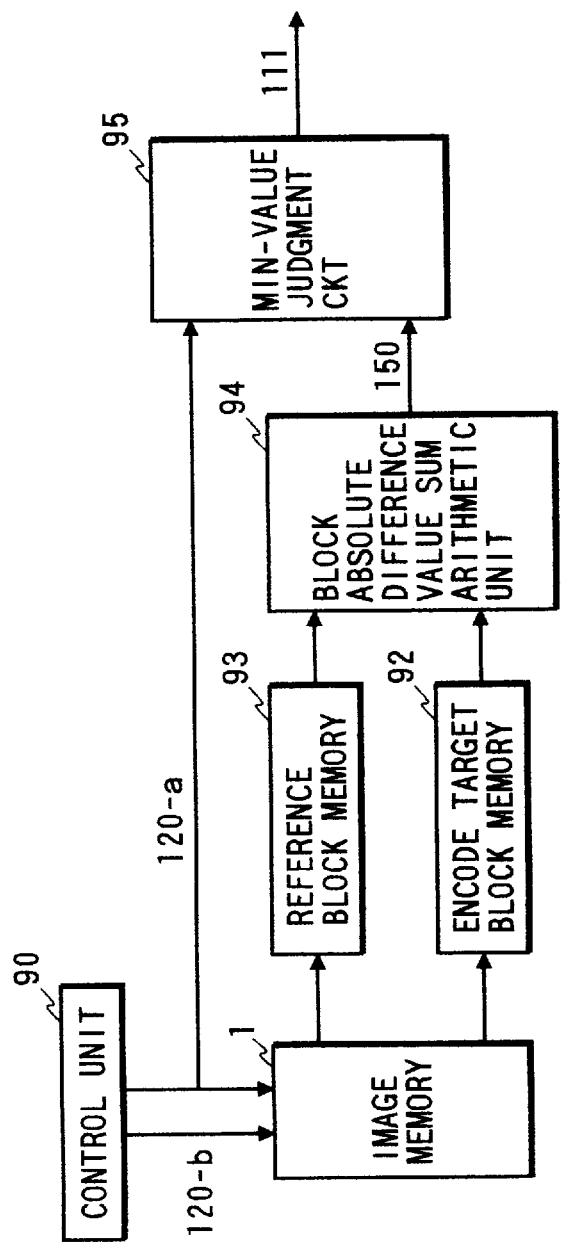
FIG. 9 is a block diagram of an analogous block mode judgment unit 81.

FIG. 9 is a block diagram of a portion for generating the difference from the analogous block. At the search of the analogous block area, a control unit 90 sends vector information (x, y) 120a of the encoded area to an image memory 1 and a minimum value judgment circuit 95, and also sends position information (x, y) 120b of the encoding target block to the image memory 1.

The image memory 1 release the image data of the encoding target block and those of a reference block, indicated by the vector information 120a in the course of the analogous block, and these image data are respectively stored in block memories 92, 93.

Then a block absolute difference sum arithmetic unit 94 calculates the block absolute difference sum 150 of the block memories 92, 93, for supply to a minimum value judgment circuit 95.

FIG. 19 shows the manner of determination of the block absolute difference sum in the analogous block mode.

Difference data N(i, j) indicates the difference of the encoding target block M(i, j) with respect to the reference block P(i, j).

The block absolute difference sum is the sum of all the absolute values of N(1, 1) to N(4, 4).

The minimum value judgment circuit 95 judges, within a preselected area, the position of the reference block and the difference between the blocks when the block absolute difference sum 150 becomes minimum and releases data 111 including the vector information 111a and the difference data 111b.

FIG. 10 shows the manner of reference to the analogous block.

In the illustrated example, the search area for the 4×4 pixel block is from +8 to −8 pixels in the main scanning direction, and from 0 to −8 lines in the sub scanning direction. An area from (1, −1) to (8, −1), from (1, −2) to (8, −2) and from (1, −3) to (8, −3), marked with X, is an inhibited area for reference, as an unencoded pixel will be contained in the reference block.

The (x, y) vector information 120a of the reference block moves in succession to the right from (−8, −8), and, after reaching (8, −8), moves from (−8, −7) to (8, −7). Thereafter the referencing movement is continued in a similar manner.

FIG. 11 shows an example of the encoded data 102 generated by the code generator 51 of the embodiment 2.

At the head of the encoded data 102 for each encoding target block, there are provided block encoding mode number data, indicating the encoding mode employed in each encoding target block. Thereafter provided, in case the analogous block mode is selected, is the (x, y) vector information 120a of the reference block, and the Huffman codes and the additional bits assigned as shown in FIG. 7, for the differences corresponding to the pixels within the 4×4 pixel block as shown in FIG. 20.

As explained in the foregoing, the embodiment 2 is provided with the DPCM encoding mode in which judgment is made as to whether uniform correlation exists in the nearby pixels in the longitudinal or transversal direction in the encoding target block and a state of minimum block absolute difference sum is selected, and the analogous block mode for searching an analogous block in the unit of each pixel block and encoding the difference between such analogous block and the encoding target block. Thus efficient encoding can be attained even in the absence of uniform correlation within the nearby pixels to each of the pixels in the encoding target block.

Also the analogous block mode of the present embodiment, being also capable of searching the correlation of the nearby pixels in the unit of a block, can improve the accuracy of search and the encoding efficiency, in comparison with the conventional method in which the search can only be made within the already encoded pixels.

[Embodiment 3]

In the embodiment 2, there may be encountered a case in which the encoding target block and the reference block are analogous in print pattern, although they are different in density or luminosity.

For coping with such situation, there is conceived a method of identifying a block with an analogous waveform by comparing each encoding target block with blocks within a predetermined area based on the frequency distribution, and encoding the difference data between the pixels of the encoding target block and those of such analogous waveform block.

FIG. 12 shows an example of the encoding mode judgment circuit 2 for realizing such encoding method (hereinafter called analogous waveform block mode).

A DPCM encoding mode judgment unit 80 and an analogous block mode judgment unit 81 are similar to those in the embodiment 2.

An analogous waveform block mode judgment unit 84 generates data 112 including vector information 112a and difference data 112b of an analogous waveform block, which provides a minimum block absolute difference sum between the analogous waveform block and the encoding target block. The method of generation of the absolute difference sum will be explained later.

Figure 14:
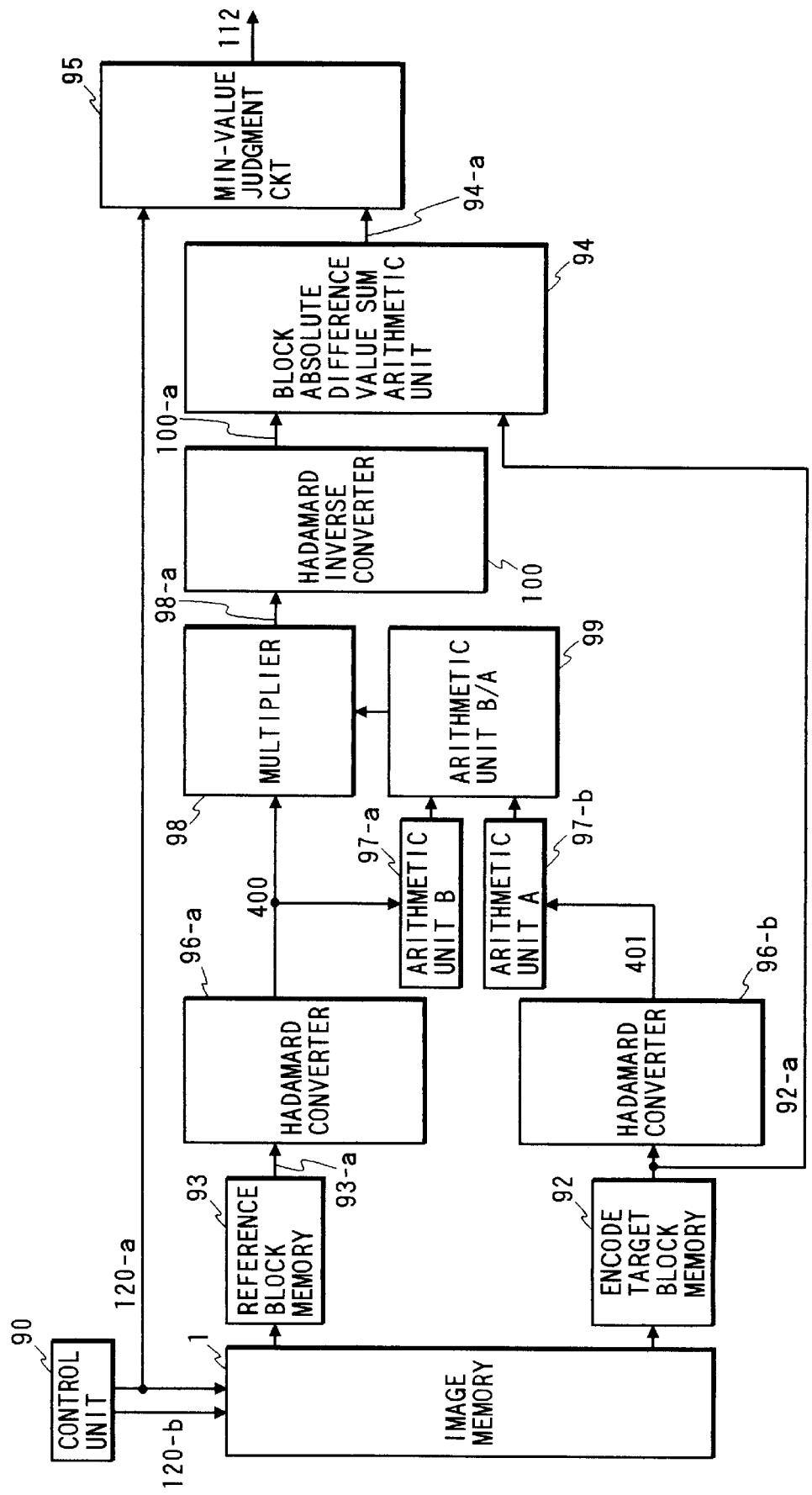
FIG. 14 is a block diagram of an analogous wave form block mode judgment unit 84.

In the following there will be explained, with reference to FIG. 14, the block configuration of the analogous waveform mode judgment unit and the method of generating the block absolute difference sum.

At the search of the analogous waveform block, a control unit 90 sends (x, y) vector information 120a of the already encoded area to an image memory 1 and a minimum value judgment circuit 95.

It also sends (x, y) positional information 120b of the encoding target block to the image memory 1.

Pixel block data 92a, 93a, read from an encoding target block memory 92 and a reference block memory 93 similar to the memories in FIG. 9, are respectively converted into coefficient components 400, 401 in Hadamard converters 96a, 96b, which will be explained further in the following. Arithmetic units 97a, 97b calculate square sum of the pixels within the respective blocks and release square sum data A, B.

Then an arithmetic unit 99 calculates a gain B/A, and a multiplier 98 releases a value 98a obtained by multiplying the output 400 of the Hadamard converter 96a with the gain B/A. The value 98a is inverse converted by an inverse Hadamard converter 100 to generate reference block data 100a having a density level matching that of the encoding target block.

A block absolute difference sub arithmetic unit 94 generates a block absolute difference sum 94a by processing the encoding target block data 92a and the reference block data 100a of a density level matching that of the encoding target block, in the same manner as in FIG. 19 for the encoding target block and the reference block.

A minimum value judgment circuit 95 generates data 112 including vector information 112a of the reference block and the difference data 112b between the blocks, when the block absolute difference sum data 94a become minimum.

Then a minimum value judgment circuit 85 in FIG. 12 compares the difference data 110b, 111b, 112b contained in the data 110, 111, 112 and selects the smallest data.

Then a mode signal generator 86 judges whether the encoding is to be executed in the DPCM encoding mode, the analogous block mode or the analogous waveform block mode, and generates an encoding mode signal 101b instead of the encoding mode signal 101 in the embodiment 1.

The Hadamard conversion employed in the present embodiment is a method for converting an image into frequency components, and there may also be employed other frequency converting methods.

The Hadamard conversion is defined as follows:

$$(y)\ ij \rightarrow (Y)\ ij$$

$$y = (y11, y12, \ldots y44)$$

$$Y = (Y11, Y12, \ldots Y44)$$

$$Y = (H4)^2\ y$$

wherein $$H4 = \begin{pmatrix} 1 & 1 & 1 & 1 \\ 1 & -1 & -1 & -1 \\ 1 & -1 & -1 & 1 \\ 1 & -1 & 1 & -1 \end{pmatrix}$$

wherein $(H4)^2$ is a Cronecker product of H4 and H4.

Figure 13:
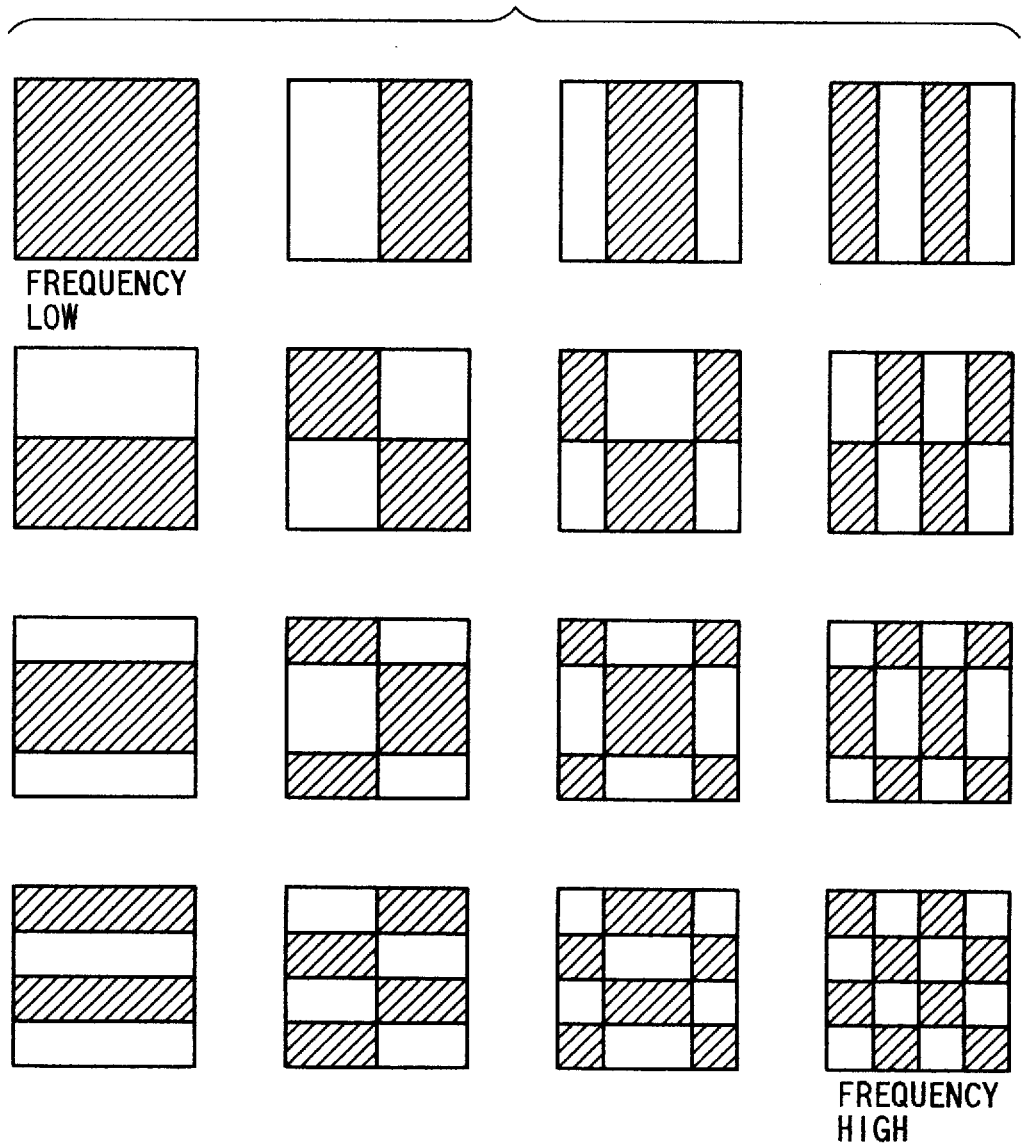
FIG. 13 is a view showing sequence components of Hadamard transformation.

FIG. 13 shows the sequence of Hadamard conversion, in which the frequency becomes higher toward the lower right corner.

Figures 15, 16:
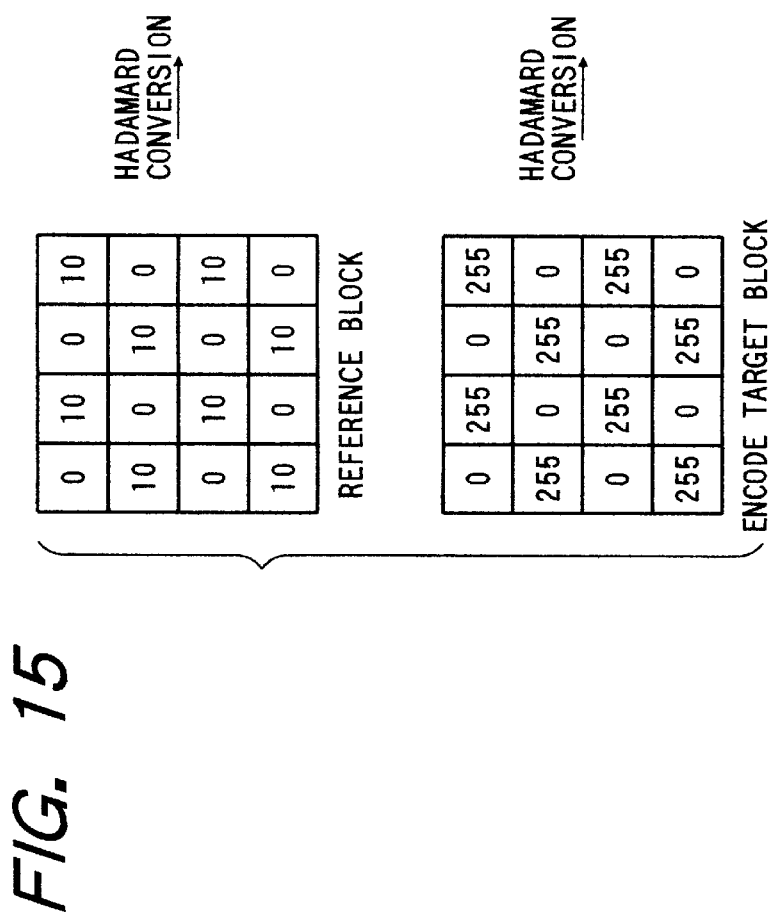
FIG. 15 is a view showing an example of analogous wave form blocks.
FIG. 16 is a view showing an example of encoded data format in an embodiment 3.

FIG. 15 illustrates the method of judging an analogous waveform.

Two blocks illustrated in FIG. 15 represent a case where the images in these blocks have a same waveform but are different in the amplitude. If the difference data are generated in the method of the embodiment 2, these blocks will generate very large difference data, indicating a low similarity.

However the comparison of the coefficients before and after the Hadamard conversion reveals that the positions of the pixels with effective coefficients (non-zero pixels) are the same and the ratio of the coefficients (2040/80) is also same in both blocks. It is therefore possible to reproduce the values of the other block, as already explained in FIG. 14, by calculating the ratio of the coefficients, correcting the coefficients of a block with thus calculated ratio and effecting inverse conversion.

In the present embodiment, the gain or the ratio of the coefficients is calculated by the ratio of the square sum of all the coefficients. Based on this method, it is possible, in the decoding side, upon receiving the (x, y) positional information of the analogous waveform block, gain information and gain information of the encoding target block, to reproduce the pixel values of the encoding or decoding target block by effecting Hadamard conversion on the analogous waveform block obtained from the already decoded area, then multiplying with the coefficient values and the gain, then effecting inverse conversion to obtain pixel data, and adding thereto the difference data.

FIG. 16 shows an example of the encoded data 102 generated by a code generator 51 of the embodiment 3.

At the head of the data of each encoding target block, there are provided block encoding mode number data, indicating the encoding mode for each block. In case the analogous waveform block mode is selected, there are then provided (x, y) vector information of the reference block, gain component information for waveform correction and Huffman codes and additional bits assigned as shown in FIG. 7 for 16 differences within the 4×4 pixel block shown in FIG. 20.

In case an image analogous to the encoding target block in the pattern but different in the density or luminosity exists in the already encoded area, the present embodiment 3 allows to reduce the difference data between the corresponding pixels of the reference block and the encoding target block by matching the density level of the former with that of the latter. It is thus rendered possible to achieve even more efficient encoding, in comparison with the foregoing embodiments 1 and 2.

The embodiments 1 to 3 explained above allow to select an efficient encoding mode from predetermined plural difference encoding modes, for each encoding target block, prior to the encoding operation. Consequently it is possible to select an efficient encoding, without effecting plural encoding operations corresponding to such plural encoding modes.

As a result, it is made possible to select one of the plural encoding modes, without utilizing plural independent encoding means.

Also the present embodiment enables high-speed encoding as it requires only one encoding, whereas the conventional configuration has to effect plural encodings if there is provided only one encoding means.

[Variation of embodiment 1]

The above-mentioned search for the analogous waveform may also be applied for the search of movement in the encoding of a moving image. The conventional method of movement search is based on a parallel displacement of a rigid member and is not effective in case the luminosity varies for example by the illumination, but the method of the present invention is sufficiently applicable to the case where the luminosity varies.

[Variation of embodiments 2 and 3]

As a variation of the embodiments 2 and 3, the difference calculation of the encoding target block in the analogous block mode or in the analogous waveform block mode may also be made by rotating the reference block as will be explained in the following with reference to FIGS. 21A and 21B. Thus, in comparison with the embodiments 2 and 3, it becomes possible to extract a further analogous block. In the following there will be briefly explained an example of such method.

Figure 21A:
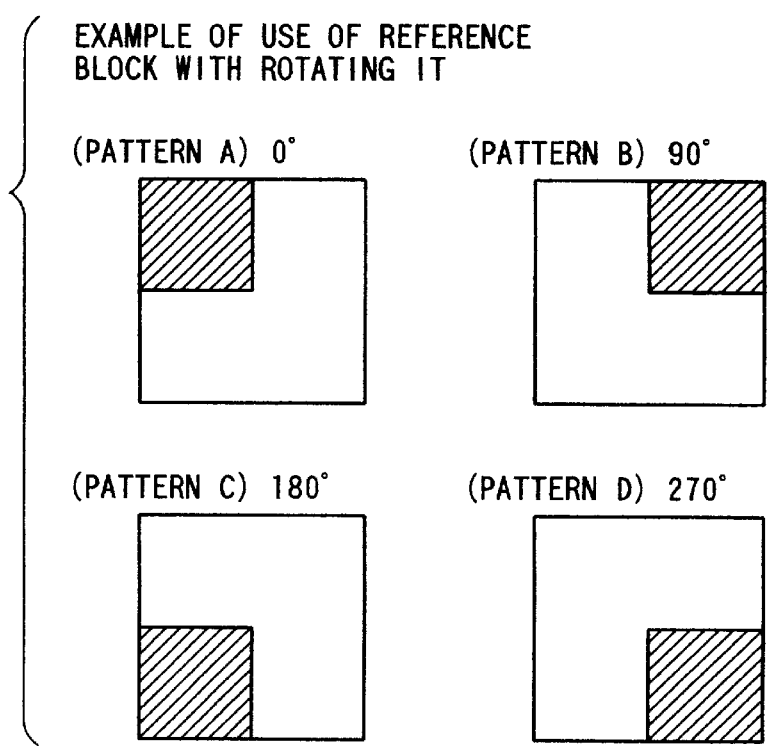
FIG. 21A is a view showing the mode of use of a reference block in rotated states.

FIG. 21A shows four patterns obtained by rotating a reference block.

The comparison with such rotated reference block can be achieved, in transferring the 4×4 pixel block data from the image memory 1 to the encoding target block memory 92 or the reference block memory 93, by varying the sequence of reading the pixels in the block.

In case of using 4 patterns of the reference block for each of the analogous block mode and the analogous waveform block mode, minimum difference data are generated for each pattern. Thus, there are generated 8 difference data in total, for the analogous block mode and the analogous waveform block mode.

A minimum value judgment circuit, constructed similarly to the minimum value judgment circuit 85 in FIG. 12, selects the smallest one among the minimum value data from the DPCM encoding mode judgment unit and the eight minimum value data mentioned above.

The subsequent process is similar to that in the foregoing embodiments.

In the present embodiment, if similarity to the encoding target block is obtained by an exchange of the in-block pixel positions of a non-analogous reference block, there may be applied the method of varying the sequence of transferring the 4×4 pixel block data to the encoding target block memory 92 or to the reference block memory 93, as in the above-mentioned rotation of the reference block. This method will be explained in the following.

Figure 21B:
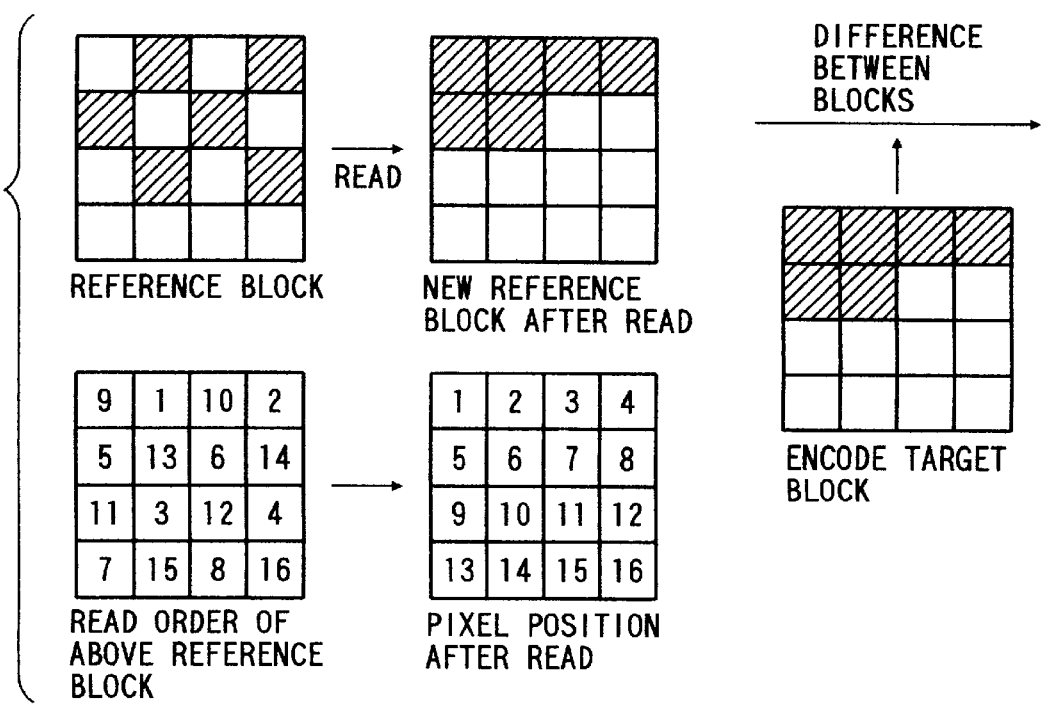
FIG. 21B is a view showing a variation in obtaining the difference between a reference block and an encoding target block.

In FIG. 21B, the illustrated reference block has very low similarity to the encoding target block.

However, a new reference block can be generated by reading the pixels of the reference block in the illustrated order, in transferring these pixels into the reference block memory 93. Thus there can be obtained a reference block which is very analogous to the encoding target block. (A similar result can also be obtained by modifying the order of reading the pixels of the encoding target block.)

Also in such reading of the pixels of the reference block, a same pixel may be read plural times, if within the 4×4 pixel block.

It is therefore possible to generate various reference block patterns from a reference block, by arbitrarily varying the sequence of transferring the pixels of the reference block or the encoding target block to the respective block memories.

The foregoing explanation has been limited to the encoding side, but inverse operations are conducted in the decoding side.

Figure 22:
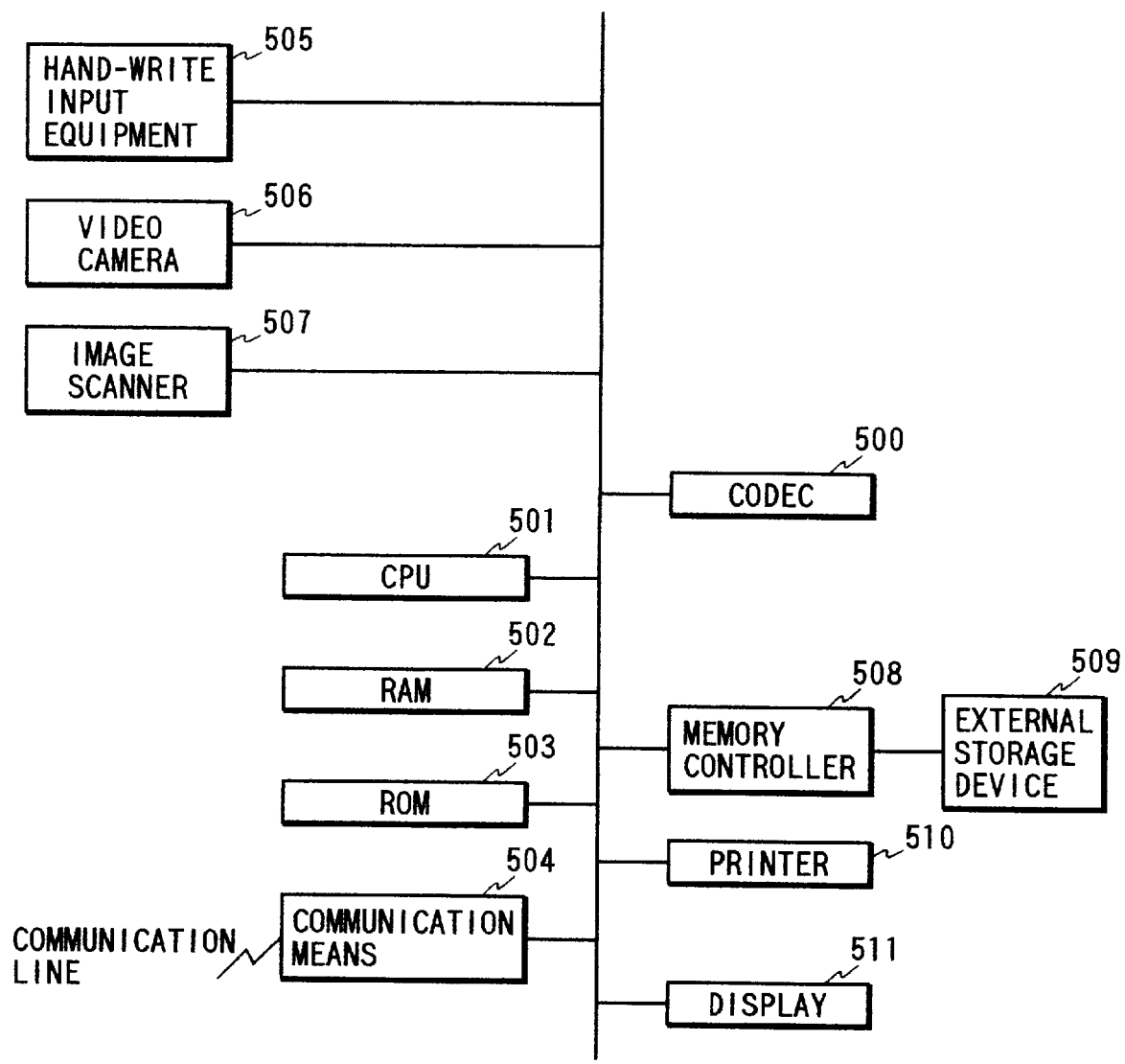
FIG. 22 is a view showing an example of relationship between the encoding device of the present invention and other peripheral devices.

The first process from the image memory 1 to the compression memory 4 in FIG. 2, explained in the foregoing embodiment, is included in a codec 500 shown in FIG. 22.

FIG. 22 shows a system including the encoding part and the decoding part of the present embodiment. The codec 500 is provided with an encoding part having the first process shown in FIG. 2 and a decoding part having a process (second process) inverse to the first process.

A CPU 501 controls the entire system.

There are also provided a RAM 502, ROM 503, communication means 504 capable of data exchange through a wired or wireless communication line, a handwriting input equipment 505, a video camera 506, and an image scanner 507.

A memory controller 508 is provided for data exchange with an external memory device 509 such as a hard disk or a CD-ROM.

There are also provided a printer 510, and a display 511.

In encoding, the code 500 fetches the image data into the memory 1 from input means as shown in FIG. 22.

At the output of the encoded data, the data are read from the compression memory 4 shown in FIG. 2.

In decoding, compressed data are fetched in a compression memory used in the second process, from a device for example the communication means 504 shown in FIG. 22.

Such input and output of the data are controlled by the CPU 501.

Also at the output of the decoded data, the data are read from an image memory which stores a decoded image obtained by the second process.

The foregoing embodiments 1 to 3 employ Huffman encoding which is a reversible encoding, but there may also be employed arithmetic encoding or non-reversible encoding.

The configuration shown in FIG. 12 employs a combination of three encoding mode judgment units, but it is also possible to combine the analogous block mode judgment unit 81 and the analogous waveform block mode judgment unit 84 or to prepare a new combination by setting another encoding mode.

Also the difference calculation in the embodiments 1 to 3 may be made, instead of between the encoding target pixel X and the reference pixel A, B or C as shown in FIG. 3A, between the pixel X and a nonadjacent pixel as shown in FIG. 3B.

[Embodiment 4]

In the foregoing embodiments 1 to 3, the Huffman encoding is singly used for encoding the difference data of the encoding target block, but, in such case, the shortest code for a pixel does not become less than 1 bit because the Huffman encoding assigns a code to the difference data of each pixel.

On the other hand, arithmetic encoding, being capable of encoding the difference data without division into each pixel, can avoid fixed bit length and is anticipated to achieve efficient encoding.

However, if the arithmetic encoding is applied to the encoding of multi-value data, it becomes difficult to prepare a model of statistical level divisions for encoding, since the arithmetic encoding effects encoding by each bit of the data.

Also in case the multi-value data have a large value, it is difficult to achieve a higher encoding efficiency than in the Huffman encoding.

For this reason, the arithmetic encoding is employed when the difference data are small, and the Huffman encoding is employed when the difference data are large.

Also in case plural encoding methods are used within an image, it is necessary to generate information on the division of areas, but independent generation of such information is inefficient. Consequently there is adopted a method of including the information on the division of areas within the encoded data.

Figure 23:
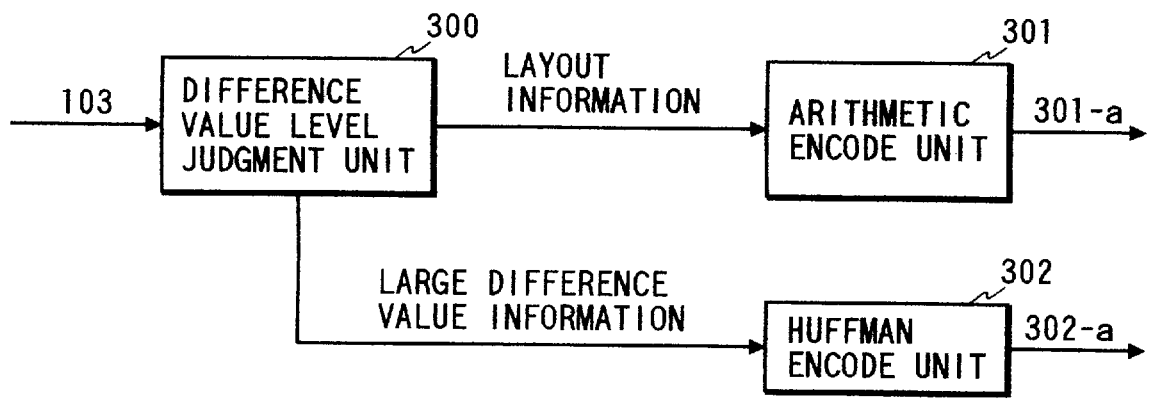
FIG. 23 is an internal block diagram of an encoding unit 51 in an embodiment 4.
Figure 24:
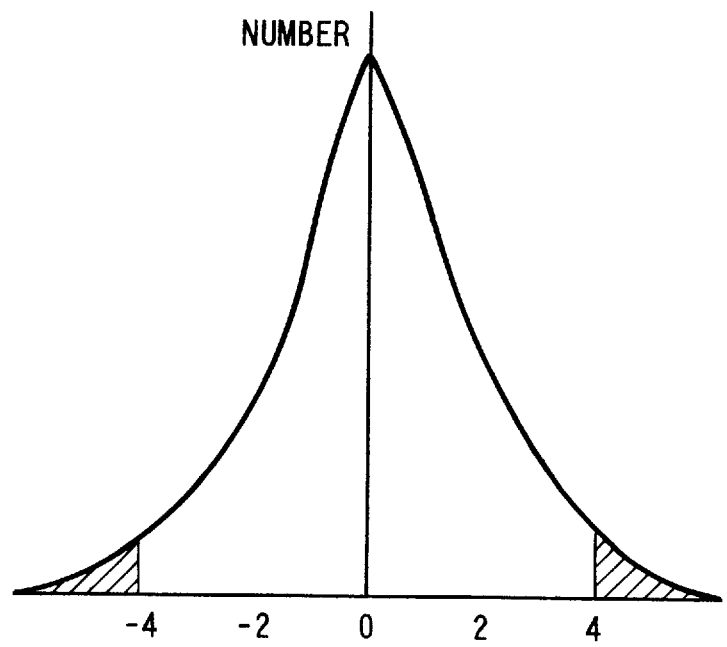
FIG. 24 is a histogram of difference data.

FIG. 23 is a block diagram of an encoding unit for the difference data 103, in the code generator 51 in FIG. 5. The magnitude of the difference data 103 is judged by a difference level judgment unit 300. The histogram of the difference data assumes the form of a Laplacian distribution with a peak at 0, as shown in FIG. 24.

This histogram indicates that the frequency of emergence of difference is high in the levels 0, ±1, ±2 and ±3 in this descending order, but is low in other levels.

Again referring to FIG. 23, if the difference data 103 are small, there is generated layout information to be explained later, for encoding of the difference data without division into each pixel, and this layout information is supplied to the arithmetic encoding unit 301, which effects arithmetic encoding of the layout information.

If the difference data are large, the layout information is generated in the same manner as in the case of small difference data, but the difference data 103 are separately supplied to the Huffman encoding unit 302, in order to effect the Huffman encoding which is easier in the preparation of the encoding model.

Figure 25:
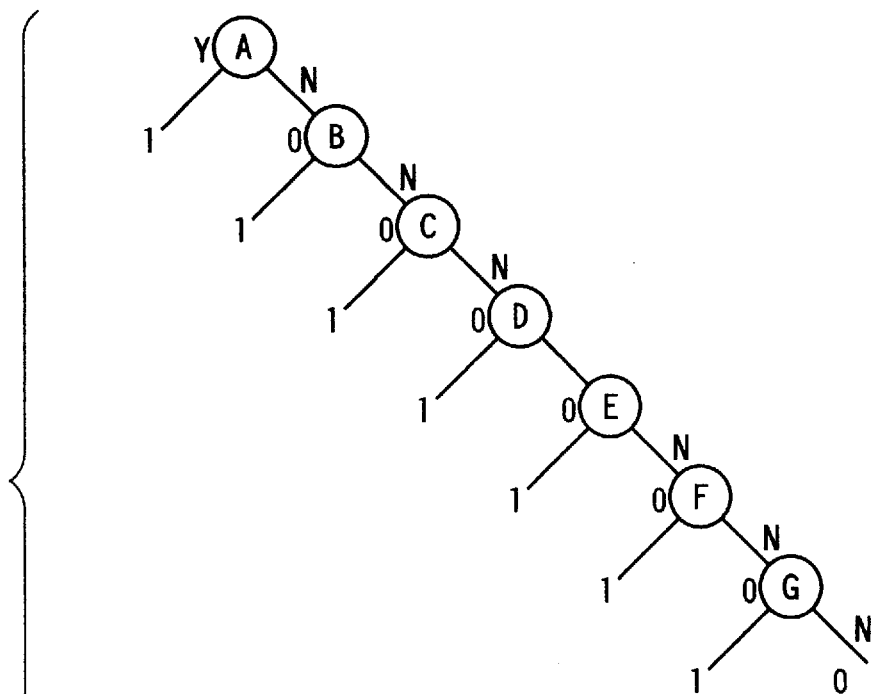
FIG. 25 is a view showing a judgment method by a judgment tree in a difference level judgment unit 300.

FIG. 25 illustrates a judgment tree, employed in the difference level judgment unit 300 for judging the magnitude of the difference data 103. In the following there will be given a detailed explanation, with reference to FIG. 25, on an example of such judgment tree.

In the following explanation, YES and NO are respectively assumed as 1 and 0, but this assumption may naturally be inversed.

At first there is judged whether the difference data 103 is equal to or larger than 4 or equal to or smaller than −4, and, if YES, a signal "1" is supplied to the arithmetic encoding unit 301 as a signal indicating the partition of data of a pixel. In case of NO, a signal "0" is sent to the arithmetic encoding unit 301 and the judgment is continued.

Then there is judged whether the difference data 103 is 3, and a signal "1" or "0" is released respectively in case of YES or NO.

The judgment is thereafter continued in a similar manner, in the sequence of −3, 2, −2, 1 and −1.

If the judgments to −1 are all NO, the output signal becomes "0000000", which indicates that the difference data is 0.

These output signals are called layout information.

Based on this layout information, the decoding side can identify, upon receiving a signal "1" in succession, the second "1" not as a difference data but as a pixel position where a Huffman code, to be explained later, is to be inserted.

In this manner the layout information contains the positional information on the division of areas in case of using plural encoding methods.

The magnitude of the difference data is judged in succession on each pixel of the difference data 103, and the released layout information is consecutively supplied, in the unit of a bit, to the arithmetic encoding unit 301.

The arithmetic encoding unit 301 effects encoding of the layout information, in continuous manner in the unit of a bit, independently from the partition of the data by the pixels.

The difference level judgment unit 300, upon selecting YES in a state A in the judgment tree in FIG. 25, sends the value of the difference data 103 for a pixel under current judgment, to the Huffman encoding unit 302.

The Huffman encoding unit 302 effects, in succession, Huffman encoding of the difference data 103 of a pixel, only for the data 103 identified as large by the difference level judgment unit 300. An example of assignment of the Huffman codes to the difference data is shown in FIG. 28.

The difference data equal to or larger than 128, or equal to or smaller than −128 are encoded with special (ESC) codes, as they only appear rarely.

For example a difference of 200 is represented by ESC and a Huffman code corresponding to 76 (=200−124).

The list of such Huffman codes may be prepared according to the measured frequency of appearance of the difference data for each image, or may be prepared from a representative image.

FIG. 27 shows the format of the encoded data 102, finally released from the code generator 51 in the embodiment 4.

The code data shown in FIG. 6, 11 or 16 are classified and regrouped, in the present embodiment, according to each form of the information. Thus there is at first generated block information, including the block encoding mode number, the (x, y) vector information, the gain information etc.

Secondly generated is the layout information obtained by the arithmetic encoding.

This layout information mixedly contains the difference of pixels with small difference data, and the in-image position information of pixels with large difference data.

Thirdly generated are Huffman encoded data indicating the magnitude of the large difference data.

Thus efficient encoding is rendered possible, as the encoding method can be suitably switched for each pixel, according to the magnitude of the difference data thereof.

It is also rendered possible to insert, in the arithmetic encoded data, the position information of the pixels where the difference data are Huffman encoded.

It is thus no longer necessary to generate the positional information independently, and a decrease in the number of bits can be expected.

Also instead of the above-explained combination of two encoding methods (arithmetic encoding and Huffman encoding), there may be adopted another encoding method or a combination of three or more encoding methods.

[Embodiment 5]

For improving the efficiency of arithmetic encoding, there is conceived an encoding method of referring to the difference data of surrounding pixels and accordingly switching the statistical tables for the arithmetic encoding.

Figure 26A:
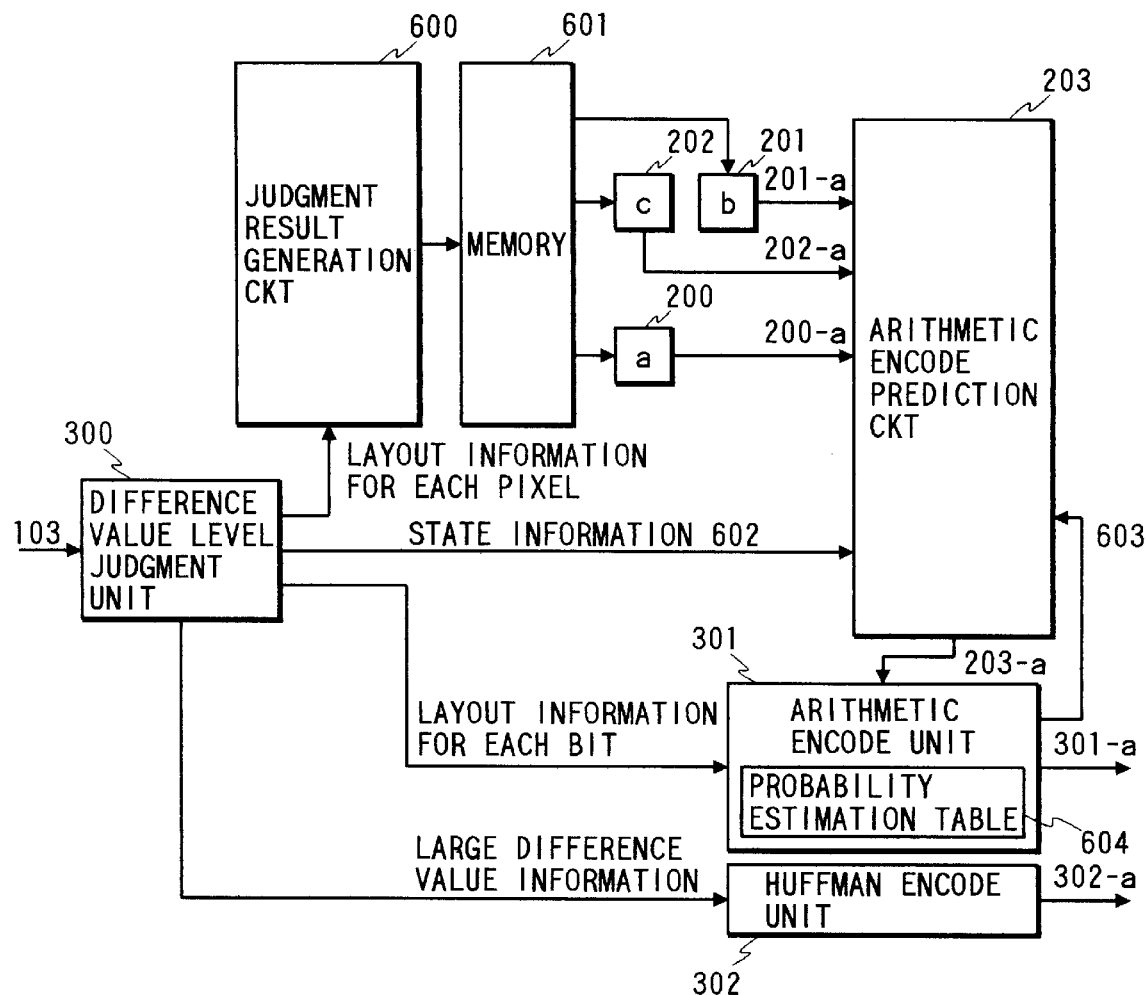
FIG. 26A is a block diagram for controlling statistical tables for arithmetic encoding in an embodiment 5.

FIG. 26A shows a variation of the block diagram shown in FIG. 23, for realizing the above-mentioned method.

A difference level judgment unit 300 generates state information 602, indicating the states A–G under judgment.

A judgment result generation circuit 600 rewrites the layout information of the already judged pixels into 3-bit data indicating 0, ±1, ±2, ±3 or another value. A memory 601 stores the above-mentioned 3-bit data, as the information indicating the magnitude of the difference data in the encoded pixels, in correspondence to the image.

Figure 26B:
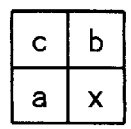
FIG. 26B is a view showing the relationship between an encoding target pixel X and surrounding pixels in FIG. 26A.

Registers 200, 201, 202 receive the difference data of surrounding pixels a, b, c of the pixel X under current judgment, as shown in FIG. 26B, and respectively release magnitude information 200a, 201a, 202a of the difference data of the pixels a, b, c.

An arithmetic code prediction circuit 203, provided with a RAM, can read and write data from or into the RAM, utilizing the 3-bit data 200, 201, 202 and the difference data of the encoding target pixel as addresses.

The above-mentioned arithmetic code prediction circuit 203 releases data 203a of the reference position number, to be referred to a probability estimation table 604 and corresponding to the combinations of the 3-bit data 200, 201, 202 and the judgment states A to G of the difference data 103 of the encoding target pixel.

The reference position of the probability estimation table of the arithmetic encoding unit 301a is reset for each bit of the input layout information.

The state setting is made by reading, from the arithmetic code prediction circuit 203, the reference position number data 203a corresponding to the combinations ($7 \times 2^3 \times 2^3 \times 2^3$) of the judgment states A to G when this bit is released as the layout information and the surrounding pixels a, b, c of the currently judged pixel X.

Then the arithmetic encoding is conducted, and the reference position for the next encoding moves according to the coincidence or non-coincidence of the prevalent symbol and the encoding target bit.

Reference position number data 603, indicating thus moved reference position, is stored in the address of the original reference position number data 203a and is used instead of the original position number data.

The arithmetic code prediction circuit 203 is provided in advance with the set values (reference position numbers of the probability estimation table) for all the combinations of the surrounding pixel data (3 bits×3) and the judged states A to G.

Each set value is read out for arithmetic encoding, then, after the encoding, is converted into the reference position number data to be referred to next time, and stored again in the arithmetic code prediction circuit 203.

By repeating the above-explained process, there can be achieved independent arithmetic encoding for each of all the combinations of the difference data of the surrounding pixels a, b, c and the judged states A to G.

In the following there will be explained a specific example. In a state where the surrounding pixels a, b, c are (3, 3, 2) and the judged state is A (represented as state (3, 3, 2, A)), the set value (reference position number data) of the state (3, 3, 2, A) is supplied to the arithmetic encoding unit 301, and the arithmetic encoding is conducted with the prevalent symbol and skew (probability that the prevalent symbol does not appear) at the reference position of the probability estimation table indicated by the above-mentioned set value.

After the arithmetic encoding, the reference position to be referred to next time varies according to the coincidence or non-coincidence of the prevalent symbol and the encoding target bit. Thus, the reference position is supplied to the arithmetic code prediction circuit 203, as the reference position data 603 to be used when the state (3, 3, 2, A) is encountered next time.

This reference position data 603 is also used next time instead of the original set value (reference position number data).

The process explained above is repeated thereafter.

The arithmetically encoded layout information is released as the layout information data 301a.

Also the large difference data, released from the difference level judgment unit 300, are released, by the Huffman encoding unit 302, as Huffman encoded data 302a.

The present embodiment, in the arithmetic encoding of the difference data of the encoding target pixel, can achieve efficient encoding since an appropriate arithmetic code statistical table is used for each combination of the difference data (a, b, c) of the surrounding pixels and the judged states A to G.

Also as the layout information data 301a are decoded prior to the Huffman encoded data 302a, it is rendered possible to recognize, from the layout information data 301a subjected to the first encoding (arithmetic encoding in the present embodiment), the position information for the pixels in which the second encoding (Huffman encoding in the present embodiment) is applied to the difference data. Thus, it is no longer necessary to have the information on the image areas subjected to the first and second encodings separately from the data 301a, 302a, smooth area division can be achieved regardless of the shape of the image areas (rectangular, non-rectangular, dot or mixtures thereof).

Also in the present embodiment, the arithmetic encoding unit 301 may selectively utilize plural probability estimation tables 604 in the unit of each bit, according to the combination of the surrounding pixels a, b, c and the judged states A to G of the currently judged pixel.

[Embodiment 6]

In the embodiments 1 to 5, the DPCM encoding mode requires limited additional information and can be achieved with a limited amount of calculation.

On the other hand, the analogous block mode and the analogous waveform block mode requires a larger amount of additional information and a larger amount of calculation.

Consequently, if the DPCM encoding mode and other two block modes are not much different in the absolute difference sum, the DPCM encoding mode will probably provide a smaller amount of encoded data, in consideration of the data amount of the additional information.

Figure 29:
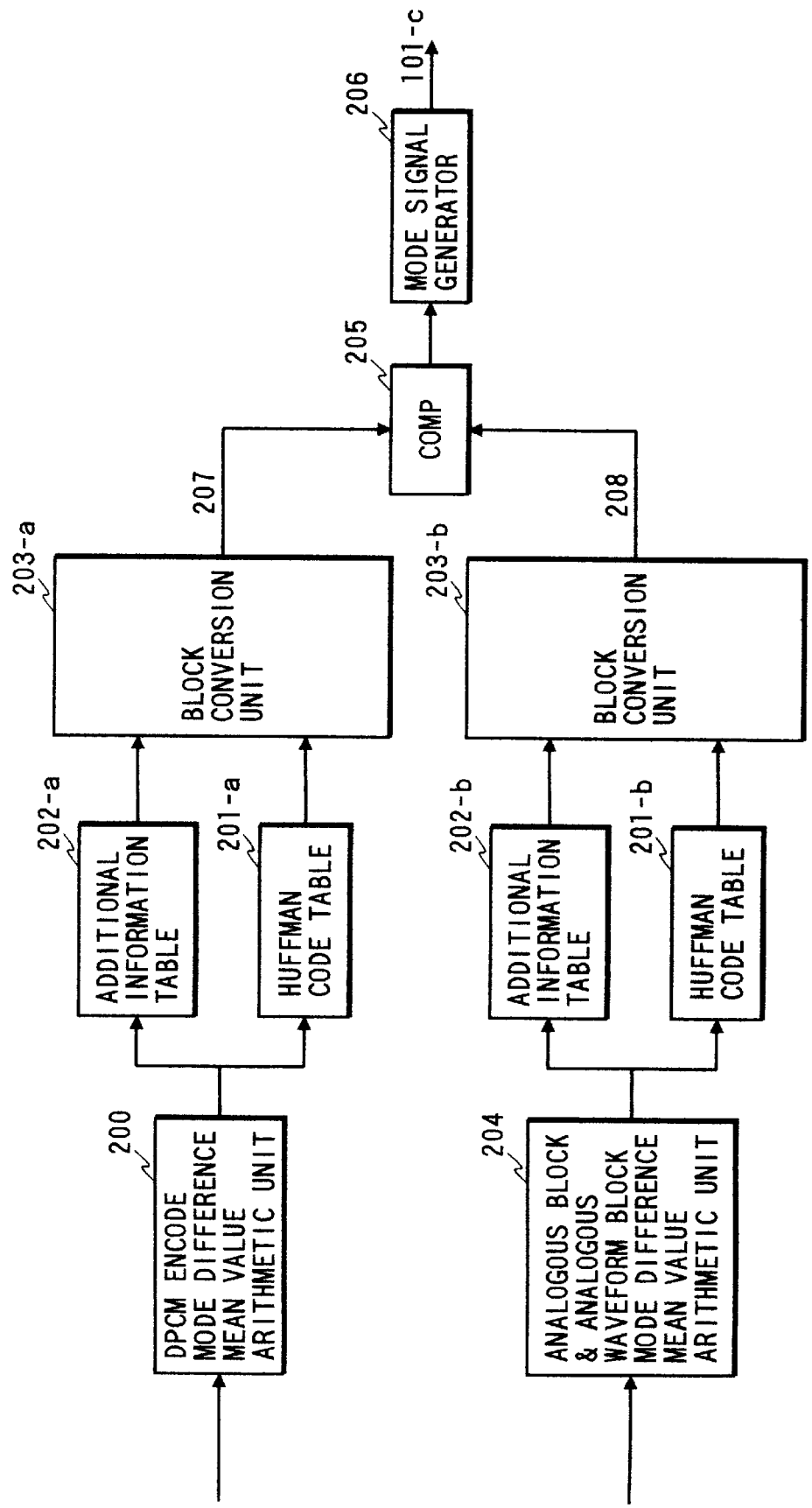
FIG. 29 is an internal block diagram of an encoding mode judgment unit 2 in an embodiment 6.

FIG. 29 is a block diagram of the encoding mode judgment unit 2 of the present embodiment, attained in consideration of the above-mentioned fact.

An arithmetic unit 200 calculates the pixel average value of the block absolute difference, by dividing the block absolute difference sum, obtained in the DPCM encoding mode unit, by the number of pixels (16 pixels in the present embodiment) within the block.

An arithmetic unit 204 similarly calculates the pixel average value of the block absolute difference on the analogous block mode and the analogous waveform block mode.

Then the predicted code lengths, indicating the number of bits of the pixel average values, are released by referring to the Huffman code tables 201a, 201b.

For small difference data (from −3 to 3), not present in the Huffman code tables, there are given predicted code lengths of about 2 bits.

Additional information tables 202a, 202b investigate and release the number of bits of the additional information (block encoding mode number data in FIG. 6, 11 or 16, or the vector information indicating the block position, or the gain information). There may also be included various other additional information, such as data indicating the block size.

Block conversion units 203a, 203b multiply the outputs, from the Huffman code tables 201a, 201b by the number (16) of pixels within the block and add the outputs of the additional information tables 202a, 202b to obtain predicted data code lengths 207, 208.

A comparator compares the predicted code lengths 207, 208 and selects the smaller one.

A mode signal generator 206 releases an encoding mode signal 101c, selected by the comparator 205, instead of the encoding mode signal 101 in FIG. 2.

In this manner it is rendered possible to prevent selection of a mode which has a larger weight of the additional information within the encoded data and provides a code length, including the additional information, longer than that in other encoding modes.

[Embodiment 7]

In case, among the seven DPCM encoding modes shown in FIGS. 3A and 3B, the smallest block absolute difference sum (or the predicted code length in the DPCM encoding mode, determined according to the embodiment 6) becomes less than a preset value, the entire process can be executed at a higher speed by passing the process of the judgment unit for other encoding modes (for example analogous block mode and analogous waveform block mode) and the process of comparing the encoding efficiency of the DPCM encoding mode and other encoding modes.

Figure 30:
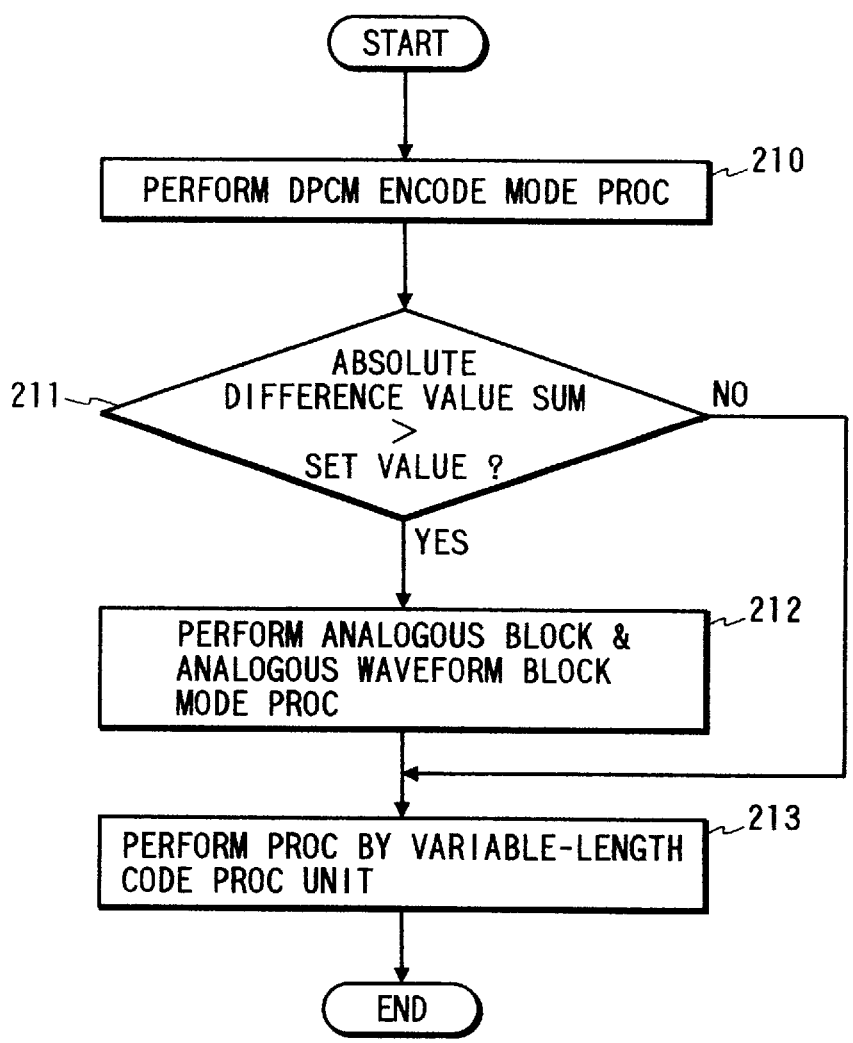
FIG. 30 is a flow chart showing the control sequence in an embodiment 7.

FIG. 30 is a flow chart of a judgment circuit for enabling such process.

A step 210 generates data enabling prediction of the encoding efficiency.

In case of FIG. 30, a DPCM encoding mode process is executed to generate the block absolute difference sum.

Instead of the block absolute difference sum, there may also be employed, for example, the predicted code length generated by the Huffman code table 201a and the additional information table 202a of the embodiment 6 shown in FIG. 29.

A step 211 judges whether thus generated value is larger than a preset value.

If not, it is ensured that the encoding by the DPCM encoding mode can sufficiently reduce the amount of the codes, so that the sequence proceeds to a step 213 for variable-length encoding.

On the other hand, if the block absolute difference sum is larger than the preset value, a step 212 executes the processes by the analogous block mode and the analogous waveform block mode, then the minimum value of the block absolute difference sum is compared with that of the block absolute difference sum obtained by the DPCM encoding mode, and the encoding mode providing the smaller one is selected.

Figure 31:
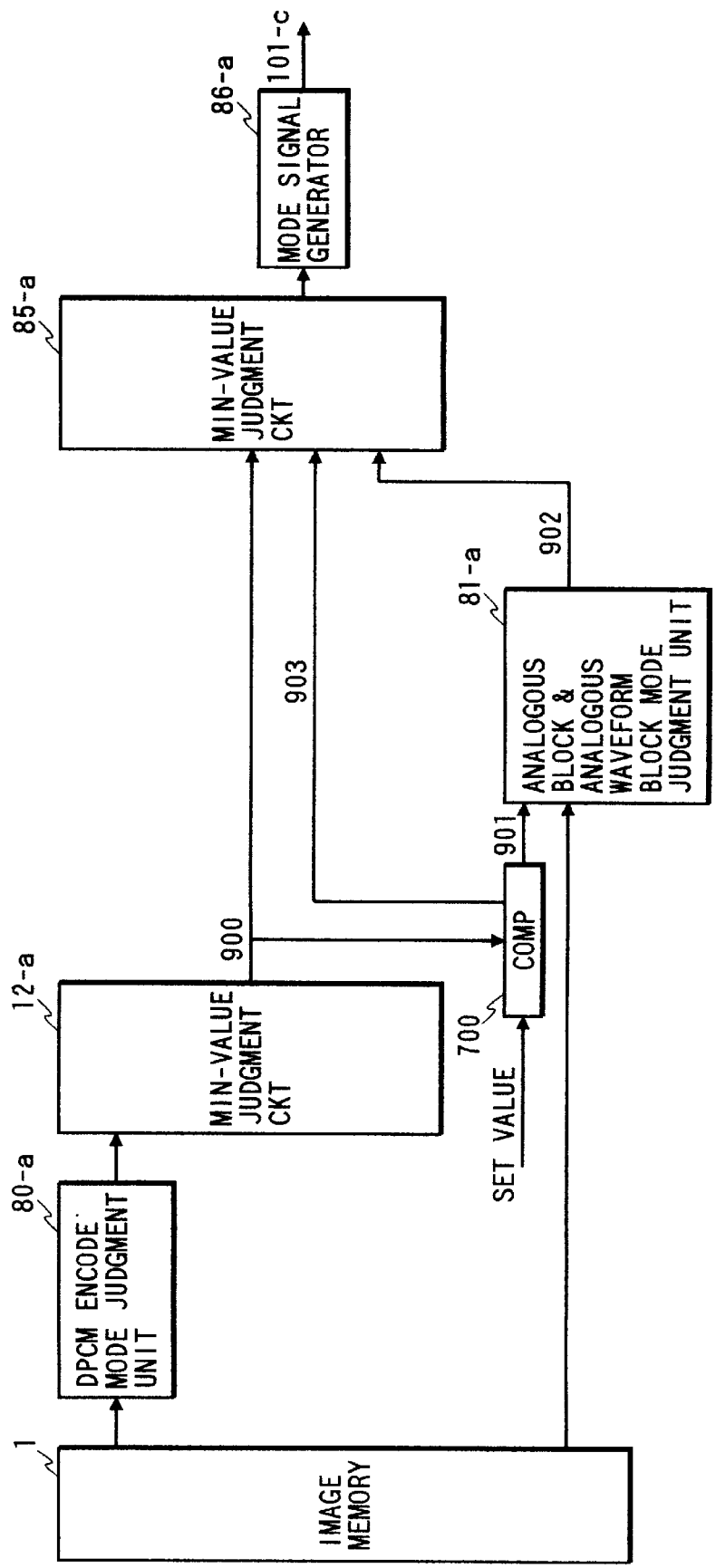
FIG. 31 is a block diagram for realizing the process of the embodiment 7.

FIG. 31 is a block diagram showing a variation of the encoding mode judgment circuit 2 capable of realizing the above-explained flow chart.

An image memory 1 and a DPCM encoding mode judgment unit 80a respectively correspond to and are same in configuration as the image memory 1 and the DPCM encoding mode judgment unit 80 in FIG. 12.

A minimum value judgment circuit 12a selects the smallest value 900 among the block absolute difference sums released from the DPCM encoding mode judgment unit 80a, for supply to a comparator 700.

The comparator 700 compares the minimum data 900 with a preset value, and, if the former is smaller, releases a start signal 901. It releases a signal 903 if the former is larger.

An analogous block/analogous waveform block mode judgment unit 81a is activated by the entry of the start signal 900, and is same in configuration as the analogous block mode judgment unit 81 and the analogous waveform block mode judgment unit 84 in FIG. 12.

The block mode judgment unit 81a releases minimum data 902 of the absolute difference sum, obtained by the analogous block mode and the analogous waveform block mode.

A minimum value judgment circuit 85a, in response to the entry of the minimum value data 900, selects the minimum value data 900 if the output signal 903 from the comparator 700 is then received, and a mode signal generator 86a releases an encoding mode signal 101c indicating the selected encoding mode.

On the other hand, if minimum value data 902 is entered next to the minimum value data 900, the smaller data is selected and the encoding mode signal 101c is similarly generated.

The present embodiment can achieve encoding with a higher speed, by dispensing with the unnecessary process time.

The present invention is not limited to the foregoing embodiments but is subject to various modifications within the scope and spirit of the appended claims.

What is claimed is:

1. An encoding device for encoding image information, comprising:

generation means for generating difference data between an encoding target pixel and pixels other than said encoding target pixel, for each of predetermined plural encoding methods;

first judging means for judging code length in case the difference data generated by said generation means are encoded, the judging being performed without encoding the difference data;

second judging means for judging data length of additional data other than the difference data generated by said generation means;

selection means for selecting an encoding method, based on the code length judged by said first judging means and the data length judged by said second judging means; and difference encoding means for encoding the difference data and the additional data in accordance with the encoding method selected by said selection means.

2. An encoding device according to claim 1, wherein said difference encoding means is adapted to effect difference encoding for each of blocks obtained by dividing said image information.

3. An encoding device according to claim 2, wherein said additional data are added to each of said blocks.

4. An encoding device according to claim 3, wherein said additional data include data indicating the encoding mode.

5. An encoding method for encoding image information comprising:

a generation step of generating difference data between an encoding target pixel and pixels other than said encoding target pixel, for each of predetermined plural encoding methods;

a first judging step of judging code length in case the difference data generated in said generation step are encoded, the judging being performed without encoding the difference data;

a second judging step of judging data length of additional data other than the difference data generated in said generation step;

a selection step of selecting an encoding method, based on the code length judged in said first judging step and the data length judged in said second judging step; and a difference encoding step of encoding the difference data and the additional data in accordance with the encoding method selected in said selection step.

6. An encoding device for selectively utilizing a first encoding method and a second encoding method, comprising:

first judging means for judging encoding efficiency in case of encoding at least a portion of a predetermined image by using the first encoding method, thereby obtaining a first judgment;

second judging means for judging encoding efficiency in case of encoding the at least a portion of the predetermined image by using the second encoding method, thereby obtaining a second judgment;

control means for inhibiting said second judging means from making the second judgment, in a case where the encoding efficiency judged by said first judging means is better than a predetermined encoding efficiency; and selection means for selecting an encoding method from among at least the first encoding method and the second encoding method in accordance with a result of the first judgment and a result of the second judgment.

7. An encoding method for selectively utilizing a first encoding method and a second encoding method, comprising:

a first judging step of judging encoding efficiency in case of encoding at least a portion of a predetermined image by using the first encoding method, thereby obtaining a first judgment;

a second judging step of judging encoding efficiency in case of encoding the at least a portion of the predetermined image by using the second encoding method, thereby obtaining a second judgment;

a control step of inhibiting making of the second judgment in said second judging step, in a case where the encoding efficiency judged in said first judging step is better than a predetermined encoding efficiency; and a selection step of selecting an encoding method from among at least the first encoding method and the second encoding method, in accordance with a result of the first judgment and a result of the second judgment.

8. An encoding method for encoding image information, comprising:

a division step of dividing the image information into plural blocks each composed of plural pixels, one of the blocks constituting an encoding target block;

a generation step of generating plural reference blocks from the image information;

a first conversion step of performing orthogonal transformation on the encoding target block to generate frequency component;

a second conversion step of performing orthogonal transformation on each of the plural reference blocks generated in said generation step, to generate a frequency component for each of the plural reference blocks;

a comparison step of comparing the frequency component for the encoding target block with the frequency component for each of the plural reference blocks;

an identifying step of identifying one of the plural reference blocks in accordance with a comparison result of said comparison step; and an encode step of encoding the encoding target block on the basis of the frequency component of the reference block identified in said identifying step.

9. An encoding device for encoding image information, comprising:

division means for dividing the image information into plural blocks each composed of plural pixels, one of the blocks constituting an encoding target block;

generation means for generating plural reference blocks from the image information;

first conversion means for performing orthogonal transformation on the encoding target block to generate a frequency component;

second conversion means for performing orthogonal transformation on each of the plural reference blocks generated by said generation means, to generate a frequency component for each of the plural reference blocks;

comparison means for comparing the frequency component for the encoding target block with the frequency component for each of the plural reference blocks;

identifying means for identifying one of the plural reference blocks in accordance with a comparison result obtained by said comparison means; and encode means for encoding the encoding target block on the basis of the frequency component of the reference block identified by said identifying means.

10. A device according to claim 9, wherein the encoding target block and the reference block are each a block of n×n pixel size, where n is a positive integer.

11. A device according to claim 9, wherein said encode means encodes a difference between the frequency component of the encoding target block and the frequency component of the reference block identified by said identifying means.

12. A device according to claim 11, wherein said encode means performs variable-length encoding on the difference.

13. A device according to claim 11, wherein the difference has been calculated after adjusting for intensity differences between the encoding target block and the reference block.

* * * * *

UNITED STATES PATENT AND TRADEMARK OFFICE
CERTIFICATE OF CORRECTION

PATENT NO. : 5,883,976

DATED : March 16, 1999

INVENTOR(S) : HIDEFUMI OHSAWA

It is certified that error appears in the above-identified patent and that said Letters Patent is hereby corrected as shown below:

Title page, item
[56] REFERENCES CITED

Other Publications
   In "Todd, S", "Selction" should read --Selection--.

[56] REFERENCES CITED

Foreign Patent Documents
   "03062737" should read --03-062737--; and "05252535"
   should read --05-252535--.

[57] ABSTRACT line 1, "enconding" should read --encoding--.

Signed and Sealed this

Thirtieth Day of November, 1999

Attest:

Attesting Officer

Q. TODD DICKINSON

Acting Commissioner of Patents and Trademarks